United States Patent
Koshimoto et al.

(10) Patent No.: US 10,927,805 B2
(45) Date of Patent: Feb. 23, 2021

(54) HIGH PRESSURE PUMP

(71) Applicant: DENSO CORPORATION, Kariya (JP)

(72) Inventors: Shinichiro Koshimoto, Kariya (JP); Kaoru Oda, Kariya (JP); Masaharu Nakaoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 224 days.

(21) Appl. No.: 15/569,487

(22) PCT Filed: Apr. 28, 2016

(86) PCT No.: PCT/JP2016/002230
§ 371 (c)(1),
(2) Date: Oct. 26, 2017

(87) PCT Pub. No.: WO2016/185681
PCT Pub. Date: Nov. 24, 2016

(65) Prior Publication Data
US 2018/0087481 A1 Mar. 29, 2018

(30) Foreign Application Priority Data
May 15, 2015 (JP) .............................. JP2015-100148

(51) Int. Cl.
*F02M 63/00* (2006.01)
*F16K 17/04* (2006.01)
(Continued)

(52) U.S. Cl.
CPC .......... *F02M 63/005* (2013.01); *F02M 59/46* (2013.01); *F04B 53/1085* (2013.01);
(Continued)

(58) Field of Classification Search
CPC .. F02M 63/005; F02M 59/46; F02M 37/0052; F02M 37/06; F16K 47/00; F16K 17/04; F16K 17/164; F16K 17/042; F16K 1/14; F16K 1/12; F16K 1/126; F16K 1/523; F16K 15/02; F16K 15/021; F16K 15/04;
(Continued)

(56) References Cited

U.S. PATENT DOCUMENTS 6,068,022 A * 5/2000 Schultz ................ F02M 37/025
137/538
6,481,458 B2 * 11/2002 Hirano ..................... F01M 1/16
137/538
(Continued)

FOREIGN PATENT DOCUMENTS

JP 7-1375 1/1995
JP 11-351089 12/1999
(Continued)

*Primary Examiner* — Essama Omgba
*Assistant Examiner* — Christopher J Brunjes
(74) *Attorney, Agent, or Firm* — Nixon & Vanderhye P.C.

(57) ABSTRACT

A valve member includes a specific range in which an overlap area that is an area in which a hole opening and a slide outer wall are overlapped with each other becomes gradually smaller and a minimum passage area that is a passage area between an intermediate chamber and a first hole being minimum becomes gradually larger as the valve member is moved in a direction away from a valve seat portion in a movable range in the axial direction.

10 Claims, 19 Drawing Sheets

(51) Int. Cl.
*F02M 59/46* (2006.01)
*F16K 47/00* (2006.01)
*F04B 19/22* (2006.01)
*F04B 53/10* (2006.01)
*F04B 53/16* (2006.01)

(52) U.S. Cl.
CPC .......... *F04B 53/1087* (2013.01); *F16K 17/04* (2013.01); *F16K 47/00* (2013.01); *F04B 19/22* (2013.01); *F04B 53/16* (2013.01)

(58) Field of Classification Search
CPC ......... Y10T 137/7734; Y10T 137/7922–7939; F04B 53/1087; F04B 53/1085; F04B 53/16; F04B 53/10; F04B 53/14; F04B 19/22; F04B 9/042; F04B 49/08; F04B 49/22; F04B 17/05; F04B 17/03
USPC ........ 417/285, 306, 307, 440, 441; 251/297, 251/90; 137/513.5
See application file for complete search history.

(56) References Cited

U.S. PATENT DOCUMENTS

| | | | |
|---|---|---|---|
| 9,188,031 B2* | 11/2015 | Hoji | F01M 1/16 |
| 2004/0134539 A1* | 7/2004 | Ressel | F02M 63/0215 |
| | | | 137/538 |
| 2007/0034262 A1* | 2/2007 | Cozens | F04B 49/03 |
| | | | 137/513 |
| 2007/0246103 A1 | 10/2007 | Enzaka et al. | |
| 2009/0116976 A1 | 5/2009 | Aritomi et al. | |
| 2012/0240893 A1* | 9/2012 | Hoji | F01M 1/16 |
| | | | 123/196 R |
| 2013/0306033 A1 | 11/2013 | Kato et al. | |

FOREIGN PATENT DOCUMENTS

| | | | | |
|---|---|---|---|---|
| JP | 2012-17801 | 1/2012 | | |
| WO | WO 2009/010177 | 1/2009 | | |
| WO | WO-2009010177 A1 * | 1/2009 | ............. | F16K 17/04 |

* cited by examiner

FUEL FLOW

FUEL FLOW

HIGH PRESSURE PUMP

CROSS REFERENCE TO RELATED APPLICATION

This application is the U.S. national phase of International Application No. PCT/JP2016/002230 filed Apr. 28, 2016, which designated the U.S. and claims priority to Japanese Patent Application No. 2015-100148 filed on May 15, 2015, the entire contents of each of which are hereby incorporated herein by reference.

TECHNICAL FIELD

The present disclosure is related to a high pressure pump using a relief valve capable of decreasing fluid pressure in a space.

BACKGROUND ART

A conventional relief valve is capable of decreasing fluid pressure in a space when the fluid pressure in the space exceeds a predetermined value. For example, a relief valve disclosed in Patent Literature 1 is connected to a discharge passage of a high pressure pump. When fuel pressure in the discharge passage exceeds a predetermined value, the relief valve returns the fuel in the discharge passage toward a pressurizing chamber of the high pressure pump, to decrease the fuel pressure in the discharge passage.

The relief valve disclosed in Patent Literature 1 includes a valve body formed in a spherical shape, and a movable holder that holds the valve body. The movable holder can be reciprocated in a guide hole together with the valve body while sliding on an inner wall of the guide hole formed in a tubular shape. The relief valve disclosed in Patent Literature 1 includes a biasing member that biases the valve body together with the movable holder toward a valve seat. Valve opening pressure that is pressure when the valve body is separated from the valve seat is set based on biasing force of the biasing member.

An area of a minimum gap between the movable holder and the guide hole, namely a minimum passage area between a pressure chamber, which is a space of the movable holder at a side of the valve seat, and a space of the high pressure pump at a side of the pressurizing chamber is set to be discontinuous such that the minimum passage area becomes larger drastically after the movable holder is moved in a direction away from the valve seat and is moved beyond a predetermined position. Thus, when the fuel pressure in the discharge passage exceeds the valve opening pressure of the valve body and then the valve body is opened, the fuel pressure in the pressure chamber is increased, and the movable holder is moved together with the valve body in the direction away from the valve seat. When a position of the movable holder exceeds the predetermined position, relatively large amount of the fuel flows from the pressure chamber toward a space at the side of the pressurizing chamber via a gap between the movable holder and the guide hole. With this, the fuel pressure in the discharge passage is decreased quickly.

In the relief valve disclosed in Patent Literature 1, it is also deemed that the minimum passage area between the pressure chamber and the space at the side of the pressurizing chamber is set to be discontinuous such that the minimum passage area becomes smaller drastically after the movable holder is moved in a direction close to the valve seat and moved beyond the predetermined position. Thus, in the pressure chamber, even if the pressure is decreased when the fuel flows from the pressure chamber toward the space at the side of the pressurizing chamber, the pressure is drastically increased again. Because a flow of the fuel toward the space at the side of the pressurizing chamber is drastically throttled when the movable holder is moved in the direction close to the valve seat and is moved beyond the predetermined position. With this, the fuel in the pressure chamber repeats the decrease and the increase in pressure and therefore pressure pulsation might be generated in the fuel in the discharge passage communicated with the pressure chamber. When the pressure pulsation is generated in the fuel in the discharge passage, a member that forms a space communicated with the discharge passage might be damaged.

PRIOR ART LITERATURES

Patent Literature

Patent Literature 1: JP 2013-241835 A

SUMMARY OF INVENTION

It is an object of the present disclosure to provide a high pressure pump using a relieve valve capable of suppressing a pressure pulsation of fluid in a space when the fluid pressure in the space is decreased.

According to the present disclosure, a relief valve arranged to be connected to a first space and a second space different from the first space and being capable of decreasing fluid pressure in the first space, includes a body, a valve seat portion, a valve member, and a biasing member.

The body includes a tubular inner wall that is an inner wall formed in a tubular shape, a hole formed to connect an inside space, which is a space inside the tubular inner wall, and the second space, and a hole opening, which is an opening of the hole formed on an inside inner wall. The valve seat portion closes one end of the tubular inner wall and includes a valve hole formed to connect the inside space and the first space, and a valve seat formed in a ring shape at an outer side in a radial direction of an end of the valve hole at a side of the inside space.

The valve member includes a valve body arranged in the body in a reciprocal manner in an axial direction, a slide outer wall, which is an outer wall to be slid on the tubular inner wall among an outer wall of the valve body, and a seat formed at a side of the valve seat with respect to the valve body and being contactable with the valve seat. The valve member forms an intermediate chamber between the tubular inner wall and the valve seat portion. The volume of the intermediate chamber is changed based on a position in an axial direction of the valve body against the tubular inner wall. The intermediate chamber can be communicated with the valve hole and hole. The valve member is formed to communicate the valve hole and the intermediate chamber with each other when the seat is separated from the valve seat and is formed to interrupt the valve hole and the intermediate chamber when the seat is contacted with the valve seat. With this, the valve member allows a flow of fluid between the valve hole and the intermediate chamber when the seat is separated from the valve seat and restricts the flow of the fluid between the valve hole and the intermediate chamber when the seat is contacted with the valve seat. The biasing member biases the valve member toward the valve seat portion.

In the present disclosure, the valve member includes at least "a specific range in which an overlap area, which is an area in which the hole opening and the slide outer wall are overlapped with each other, becomes gradually smaller and a minimum passage area, which is a passage area between the intermediate chamber and the hole being minimum, becomes gradually larger as the valve member is moved in a direction away from the valve seat portion" in a movable range in an axial direction.

In the present disclosure, when the fluid pressure in the first space exceeds the valve opening pressure of the valve member, the seat is separated from the valve seat to be opened. With this, the fluid pressure in the intermediation chamber communicated with the first space is increased, and then the valve member is moved in a direction away from the valve seat portion. In the specific range, as the valve member becomes farther away from the valve seat portion, the minimum passage area between the intermediate chamber and the hole becomes larger. Thus, as the fluid pressure in the intermediate chamber becomes larger, a flow amount of the fluid flowing from the intermediate chamber to the hole becomes larger. With this, the fluid pressure in the first space communicated with the intermediate chamber can be decreased quickly.

In the present disclosure, when the valve member is moved in the direction close to the valve seat portion, in the specific range, the overlap area between the hole opening and the slide outer wall becomes gradually larger and the minimum passage area between the intermediate chamber and the hole becomes gradually smaller. Thus, the fluid flowing from the intermediate chamber toward the hole decreases the fluid pressure in the intermediate chamber, and the flow of the fluid from the intermediate chamber toward the hole is gradually throttled when the valve member is moved toward the valve seat portion. With this, it is suppressed that "the flow of the fluid from the intermediate chamber to the hole is throttled drastically and the fluid pressure in the intermediate chamber is drastically increased again". Accordingly, it is possible to suppress the generation of the pressure pulsation in the fluid in the intermediate chamber and the fluid in the first space communicated with the intermediate chamber when the fluid pressure in the first space is decreased.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, relief valves according to a plurality of embodiments and a plurality of reference embodiments of the present disclosure are described with reference to drawings. The same numeral reference is assigned to substantially the same component in the embodiments and the reference embodiments, and the description thereof is therefore omitted. In the embodiments and the reference embodiments, substantially the same component achieves the same or a similar effect.

First Embodiment

Figure 1A:
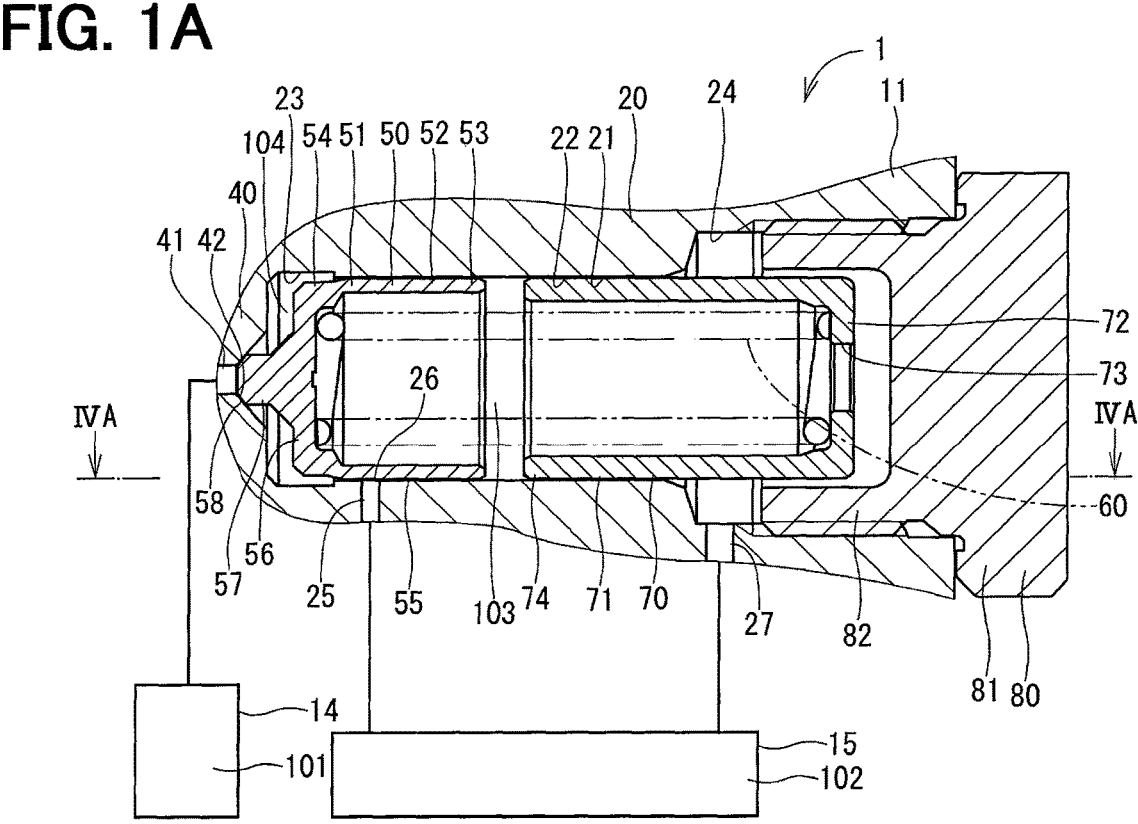
FIG. 1A is a cross-sectional view of a relief valve according to a first embodiment of the present disclosure, illustrating a state in which a seat is contacted with a valve seat.
Figure 1B:
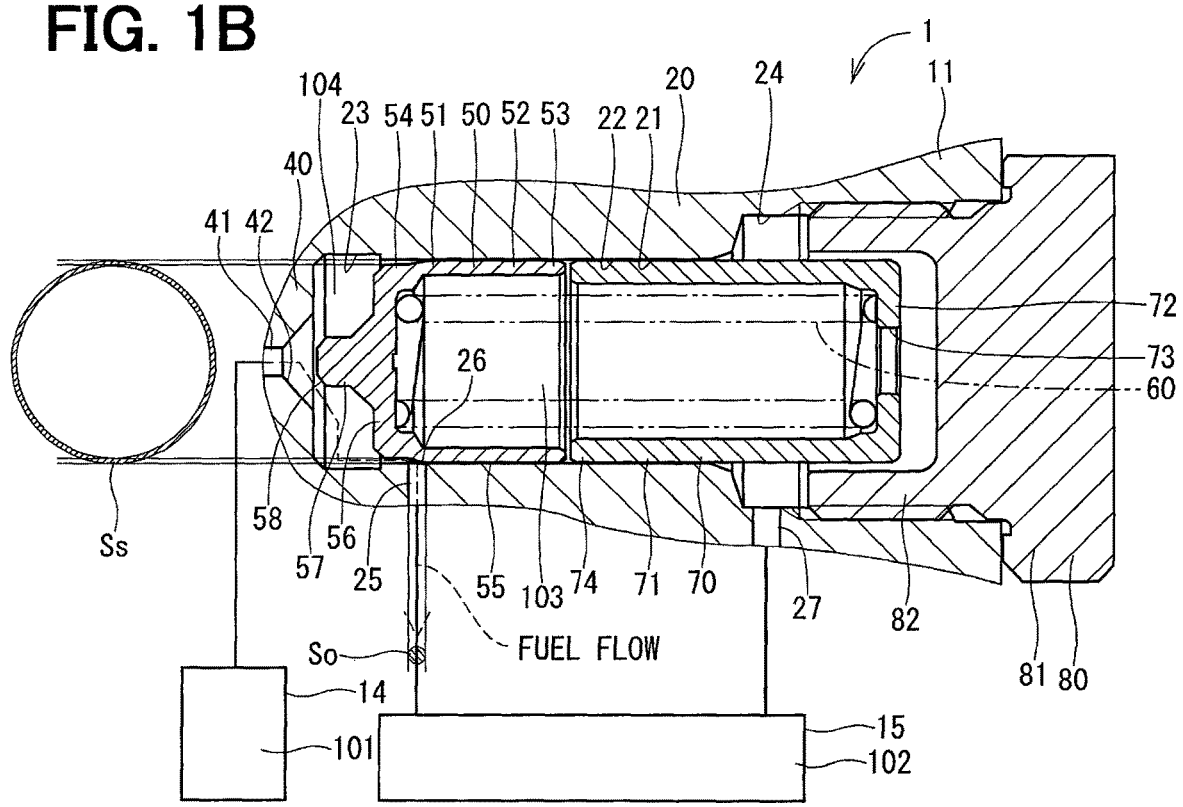
FIG. 1B is a cross-sectional view of the relief valve according to the first embodiment of the present disclosure, illustrating a state in which the seat is separated from the valve seat.

FIGS. 1A and 1B show a relief valve according to a first embodiment of the present disclosure.

Figure 2:
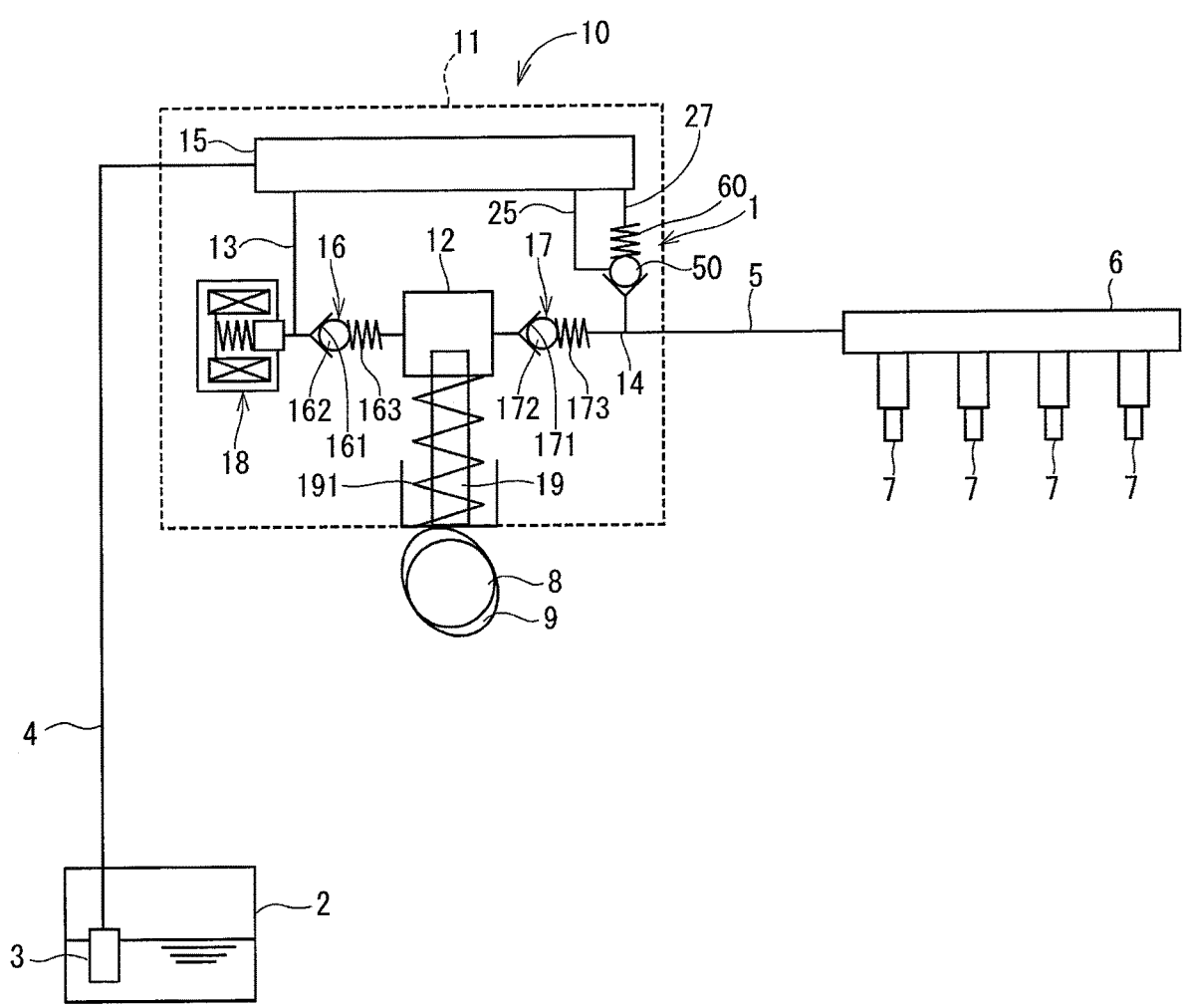
FIG. 2 is a schematic view of a high pressure pump to which the relief valve according to the first embodiment of the present disclosure is applied.

As shown in FIG. 2, a relief valve 1 is arranged in a high pressure pump 10. The high pressure pump 10 is arranged in a vehicle not shown. The vehicle can travel by using an internal combustion engine, which consumes, for example, gasoline as fuel, as a driving source.

A fuel pump 3 pumps fuel stored in a fuel tank 2 and supplies the fuel to the high pressure pump 10 via a pipe 4. The high pressure pump 10 pressurizes and discharges the fuel supplied from the fuel pump 3 and supplies the fuel to a fuel rail 6 via a pipe 5. With this, high pressure fuel is stored in the fuel rail 6. The fuel in the fuel rail 6 is supplied to the internal combustion engine of the vehicle via a plurality of injectors 7 connected to the fuel rail 6.

The high pressure pump 10 includes a housing 11, a suction valve 16, a discharge valve 17, a driving portion 18, a plunger 19, a spring 191, the relief valve 1, and the like.

The housing 11 includes a pressurizing chamber 12, a suction passage 13, a discharge passage 14, a fuel chamber 15, and the like.

Figure 3:
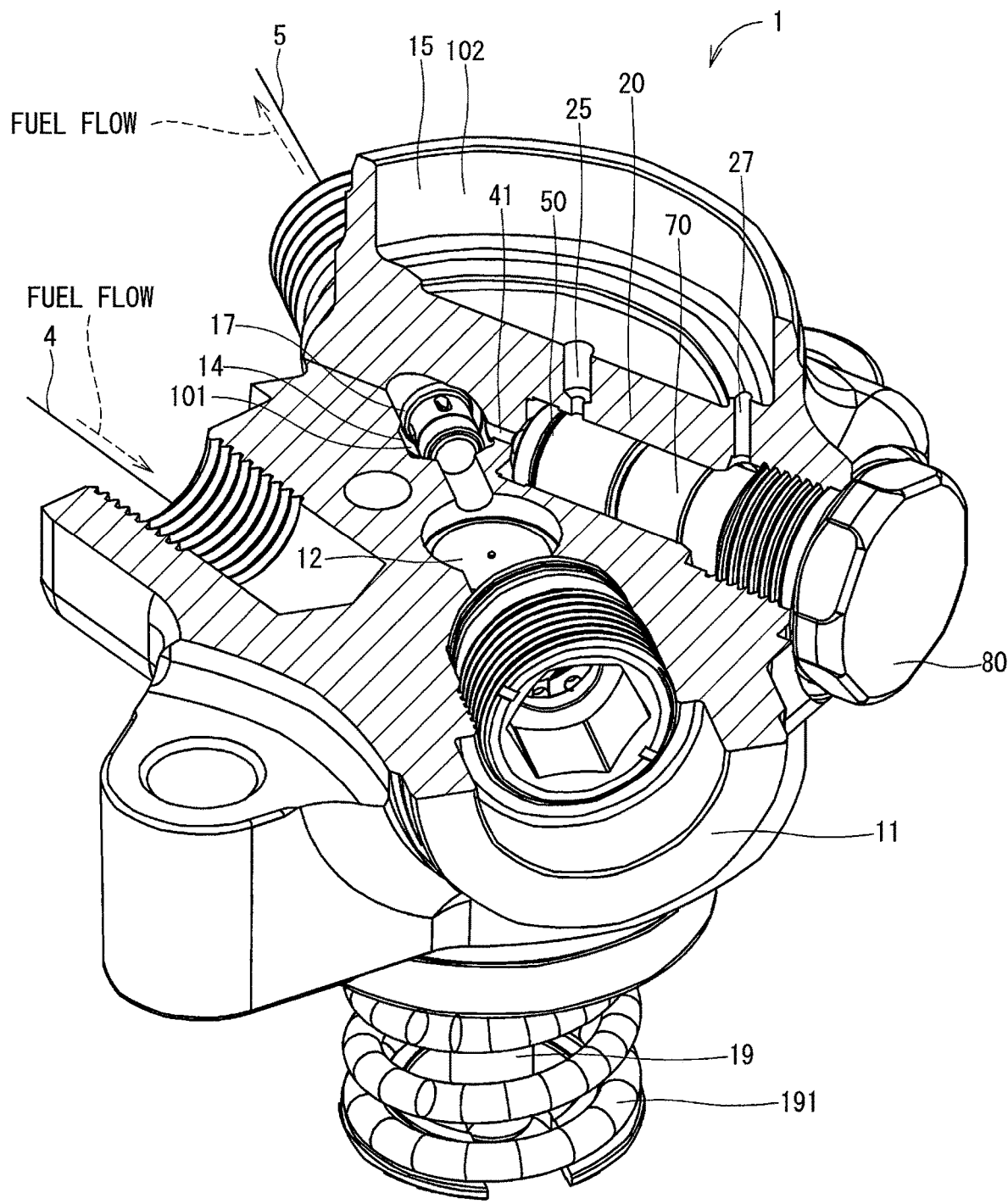
FIG. 3 is a perspective view of a partial cross section of the high pressure pump of a vehicle to which the relief valve according to the first embodiment of the present disclosure is applied.

The housing 11 is formed of, for example, metal such as stainless steel. As shown in FIG. 3, the pressurizing chamber 12, the suction passage 13, the discharge passage 14, and the fuel chamber 15 are formed, for example, by cutting the housing 11. The fuel chamber 15 is connected to the suction passage 13. The suction passage 13 is connected to the pressurizing chamber 12. The pressurizing chamber 12 is connected to the discharge passage 14. For convenience, a space in the discharge passage 14 is called a first space 101. A space in the fuel chamber 15 is called a second space 102. The second space 102 is separated from the first space 101, namely the second space 102 is a different space from the first space 101.

The pipe 4 connected to the fuel pump 3 is connected to an inlet portion formed on the housing 11 to be connected to the fuel chamber 15. With this, the fuel in the fuel tank 2 is supplied from the fuel pump 3 to the fuel chamber 15 (the second space 102) via the pipe 4 and the inlet portion.

As shown in FIG. 2, the suction valve 16 is arranged between the suction passage 13 and the pressurizing chamber 12. The suction valve 16 includes a valve seat 161, a valve body 162, and a biasing member 163. The valve seat 161 is formed on an inner wall of the suction passage 13 at a side of the pressurizing chamber 12. The valve body 162 is contacted with the valve seat 161 from a side of the pressurizing chamber 12. The biasing member 163 biases the valve body 162 toward the valve seat 161. When the valve body 162 is separated from the valve seat 161 or contacted with the valve seat 161, flowing of the fuel between the suction passage 13 and the pressurizing chamber 12 is allowed or restricted.

The discharge valve 17 is arranged between the pressurizing chamber 12 and the discharge passage 14. The discharge valve 17 includes a valve seat 171, a valve body 172, and a biasing member 173. The valve seat 171 is formed on an inner wall of the pressurizing chamber 12 at a side of the discharge passage 14. The valve body 172 is contacted with the valve seat 171 from a side of the discharge passage 14. The biasing member 173 biases the valve body 172 toward the valve seat 171. When the valve body 172 is separated from the valve seat 171 or contacted with the valve seat 171, flowing of the fuel between the pressurizing chamber 12 and the discharge passage 14 is allowed or restricted. The discharge valve 17 is served as a check valve that allows the flowing of the fuel from the pressurizing chamber 12 toward the discharge passage 14 and restricts the flowing of the fuel from the discharge passage 14 toward the side of the pressurizing chamber 12.

The driving portion 18 is provided at a side of the suction passage 13 with respect to the suction valve 16. When electric power is supplied, the driving portion 18 can be driven such that the valve body 162 of the suction valve 16 is moved to a side of the valve seat 161 or a side of the pressurizing chamber 12. In the present embodiment, for example, when the electric power is not supplied to the driving portion 18, the driving portion 18 biases the valve body 162 toward the pressurizing chamber 12 against biasing force of the biasing member 163, and then the valve body 162 is separated from the valve seat 161, namely the valve is opened. When the electric power is supplied to the driving portion 18, the driving portion 18 is driven such that force for biasing the valve body 162 toward the pressurizing chamber 12 becomes small. With this, the valve body 162 is moved toward the valve seat 161 by the biasing force of the biasing member 163 and contacted with the valve seat 161, namely the valve is closed. In this way, the suction valve 16 in the present embodiment is served as a so-called normally open type valve device in combination with the driving portion 18.

The plunger 19 is formed in a bar shape by, for example, metal such as stainless steel. The plunger 19 is arranged such that one end side of the plunger 19 is inserted into an inside of a cylinder formed in the housing 11 so as to be connected to the pressurizing chamber 12. An outer wall of the plunger 19 is slid on an inner wall of the cylinder, and then the plunger 19 is supported in a reciprocal manner in an axial direction by the inner wall of the cylinder. When the plunger 19 is reciprocated in the axial direction, volume of the pressurizing chamber 12 is changed.

The high pressure pump 10 is arranged such that another end of the plunger 19 is contacted with a cam 9 formed on a cam shaft 8 of the internal combustion engine of the vehicle. The high pressure pump 10 includes the spring 191 that biases the plunger 19 toward the cam 9. With this configuration, when the internal combustion engine is driven, the cam shaft 8 and the cam 9 are rotated while synchronizing a crank shaft, and the plunger 19 is reciprocated in the axial direction.

When the plunger 19 is moved toward the cam 9 in a state in which the suction valve 16 is opened, the volume of the pressurizing chamber 12 is increased and the fuel in the suction passage 13 is suctioned into the pressurizing chamber 12. When the plunger 19 is moved toward a side opposite to the cam 9 in a state in which the suction valve 16 is opened, the volume of the pressurizing chamber 12 is decreased and the fuel in the pressurizing chamber 12 is returned into the suction passage 13.

On the other hand, when the plunger 19 is moved toward the side opposite to the cam 9 in a state in which the suction valve 16 is closed, the volume of the pressurizing chamber 12 is decreased, and the fuel in the pressurizing chamber 12 is compressed and pressurized. When the fuel pressure in the pressurizing chamber 12 exceeds a valve opening pressure of the discharge valve 17, the discharge valve 17 is opened, and the fuel is discharged from the pressurizing chamber 12 to the discharge passage 14 (the first space 101).

The pipe 5 connected to the fuel rail 6 is connected to an outlet portion formed in the housing 11 to be connected to the discharge passage 14. With this, the fuel pressurized in the pressurizing chamber 12 is supplied to the fuel rail 6 via the discharge passage 14, the outlet portion, and the pipe 5. As a result, the high pressure fuel is stored in the fuel rail 6.

Next, a configuration of the relief valve 1 is described in detail with reference to FIGS. 1A and 1B.

The relief valve 1 includes a body 20, a valve seat portion 40, a valve member 50, a biasing member 60, a spring seat 70, a moving restriction portion 74, a sealing portion 80, and the like.

The body 20 is formed in a substantially tubular shape by, for example, metal such as stainless steel. In the present embodiment, the body 20 is integrally formed with the housing 11 of the high pressure pump 10. That is, it is also deemed that the body 20 is a part of the housing 11.

The body 20 has a tubular inner wall 21, a first hole 25 as "a hole", a hole opening 26, a second hole 27, and the like. The tubular inner wall 21 is formed by an inner wall of the body 20 and is formed in a substantially tubular shape. A space in the tubular inner wall 21 is called an inside space 103.

The tubular inner wall 21 has a reference inner diameter portion 22, a first large diameter portion 23, a second large diameter portion 24, and the like. The reference inner diameter portion 22 is formed as a part formed in a tubular shape having a predetermined inner diameter in the tubular inner wall 21. The first large diameter portion 23 is formed as a part formed in a tubular shape having an inner diameter larger than the inner diameter of the reference inner diameter portion 22 in the tubular inner wall 21. The first large diameter portion 23 is formed at one end side of the reference inner diameter portion 22. The second large diameter portion 24 is formed as a part formed in a tubular shape having an inner diameter larger than the inner diameter of the first large diameter portion 23 in the tubular inner wall 21. The second large diameter portion 24 is formed at another end side of the reference inner diameter portion 22.

The first hole 25 is formed to connect the inside space 103 and the second space 102 (the space in the fuel chamber 15). With this, the hole opening 26, which is an opening of the first hole 25, is formed on the reference inner diameter portion 22 of the tubular inner wall 21. In the present embodiment, the first hole 25 is formed such that an inner wall is formed in a tubular shape. Thus, a shape of the hole opening 26 is a circle. The shape of the hole opening 26 is a perfect circle when seen in a radial direction of the tubular inner wall 21.

The second hole 27 is formed at a different position from the first hole 25 so as to connect the inside space 103 and the second space 102 (the space in the fuel chamber 15). With this, an opening of the second hole 27 is formed on the second large diameter portion 24 of the tubular inner wall 21.

The valve seat portion 40 is formed of, for example, metal such as stainless steel. In the present embodiment, the valve seat portion 40 is formed integrally with the housing 11 of the high pressure pump 10. That is, it is also deemed that the valve seat portion 40 is a part of the housing 11 similar to the body 20.

The valve seat portion 40 is formed to close one end of the tubular inner wall 21 of the body 20, namely formed to close the tubular inner wall 21 at a side of the first large diameter portion 23. The valve seat portion 40 is formed integrally with the body 20. A side of the second large diameter portion 24 of the tubular inner wall 21 opposite to the reference inner diameter portion 22 is connected to an outer wall of the housing 11. That is, another end of the tubular inner wall 21 is open to the outer wall of the housing 11.

The valve seat portion 40 has a valve hole 41, a valve seat 42, and the like. The valve hole 41 is formed to connect the inside space 103 and the first space 101 (the space in the discharge space 14). The valve seat 42 is formed in a ring shape and arranged at an outer side in a radial direction of an end of the valve hole 41 at a side of the inside space 103. In the present embodiment, the valve seat 42 is formed in a tapered shape to be away from an axis of the valve hole 41 toward the inside space 103.

The valve member 50 is formed of, for example, metal such as stainless steel to be arranged at an inside of the body 20. The valve member 50 includes a valve body 51, a slide outer wall 55, a seat 58, and the like.

The valve body 51 includes a tubular portion 52, a bottom 56, and a protrusion 57. The tubular portion 52 has a large diameter portion 53 and a small diameter portion 54. The large diameter portion 53 is set such that an outer diameter is similar to the inner diameter of the reference inner diameter portion 22 of the tubular inner wall 21 or slightly smaller than the inner diameter of the reference inner diameter portion 22. With this, an outer wall of the large diameter portion 53 can be slid on the reference inner diameter portion 22. The outer wall of the large diameter portion 53 corresponds to the slide outer wall 55.

The small diameter portion 54 is formed as a part having an outer diameter smaller than the outer diameter of the large diameter portion 53 in the tubular portion 52. The small diameter portion 54 is formed at a side of the valve seat portion 40 of the large diameter portion 53.

The bottom 56 is formed integrally with the tubular portion 52 so as to close an end of the tubular portion 52 at a side of the small diameter portion 54. The protrusion 57 is formed integrally with the bottom 56 so as to be protruded in a tubular manner from a center of the bottom 56 toward the valve seat 42.

The valve body 51 is arranged in the body 20 in a reciprocal manner in the axial direction.

The seat 58 is formed integrally with the protrusion 57 at a side of the valve seat 42 of the protrusion 57. The seat 58 is formed in a tapered shape such that an outer wall of the end at a side of the valve seat 42 is to be closer to an axis of the protrusion 57 toward the valve seat 42. The outer wall of the end at the side of the valve seat 42 of the seat 58 can be contacted with the valve seat 42.

The valve member 50 forms an intermediate chamber 104 between the tubular inner wall 21 and the valve seat portion 40. The intermediate chamber 104 is changed in volume in accordance with a position in the axial direction of the valve body 51 against the tubular inner wall 21 and is communicated with the valve hole 41 and the first hole 25.

When the seat 58 is separated from the valve seat 42, the valve member 50 allows communication between the valve hole 41 and the intermediate chamber 104 and flowing of the fuel between the valve hole 41 and the intermediate chamber 104. When the seat 58 is contacted with the valve seat 42, the valve member 50 interrupts the communication between the valve hole 41 and the intermediate chamber 104 and restricts the flowing of the fuel between the valve hole 41 and the intermediate chamber 104.

The biasing member 60 is formed by, for example, a coil spring. The biasing member 60 is arranged on the bottom 56 at a side opposite to the valve seat portion 40 such that one end side is located at an inside of the tubular portion 52 of the valve member 50 and the one end is contacted with the bottom 56 of the valve member 50.

The spring seat 70 is formed of, for example, metal such as stainless steel. The spring seat 70 is arranged at a side opposite to the valve seat portion 40 with respect to the valve member 50. The spring seat 70 has a tubular portion 71, a bottom 72, and the like. The tubular portion 71 is set such that an outer diameter is similar to the inner diameter of the reference inner diameter portion 22 of the tubular inner wall 21 or slightly larger than the inner diameter of the reference inner diameter portion 22. The tubular portion 71 is arranged in the body 20 such that an outer wall at one side is contacted with the reference inner diameter portion 22. The tubular portion 71 is fixed to an inside of the body 20 by, for example, welding, press fitting, or the like.

The bottom 72 is formed integrally with the tubular portion 71 so as to close the tubular portion 71 at another end side. The bottom 72 has a hole 73 that connects one surface and another surface and is arranged at a center of the bottom 72. The hole 73 connects an inside space and an outside space of the tubular portion 71.

In the present embodiment, the moving restriction portion 74 is formed on an end of the tubular portion 71 of the spring seat 70 opposite to the bottom 72. The moving restriction portion 74 can be contacted with an end of the tubular portion 52 of the valve member 50 opposite to the bottom 56. Thus, the moving restriction portion 74 can restrict moving of the valve member 50 in a direction away from the valve seat 42 by contacting with the tubular portion 52. That is, in the present embodiment, the valve member 50 can be moved between the valve seat portion 40 and the moving restriction portion 74. A movable distance in the axial direction of the valve member 50 is equal to a distance between the tubular portion 52 and the moving restriction portion 74 when the seat 58 is contacted with the valve seat 42.

The biasing member 60 is arranged at a side of the valve member 50 with respect to the bottom 72 such that another end side is located at an inside of the tubular portion 71 of the spring seat 70 and the another end is contacted with the bottom 72 of the spring seat 70. A distance between the bottom 56 of the valve member 50 and the bottom 72 of the spring seat 70 when the seat 58 of the valve member 50 is contacted with the valve seat 42 is set to be shorter than a free length of the biasing member 60. Thus, the biasing member 60 biases the valve member 50 toward the valve seat portion 40.

The sealing portion 80 is formed of, for example, metal such as stainless steel. The sealing portion 80 is arranged at a side opposite to the valve member 50 with respect to the spring seat 70. The sealing portion 80 includes a body 81 and a tubular portion 82. The tubular portion 82 is formed integrally with the body 81 so as to be extended from the body 81 in a tubular manner. A screw groove is formed on an outer wall of the tubular portion 82. A screw groove, which corresponds to the screw groove of the tubular portion 82, is formed on the second large diameter portion 24 of the body 20. The sealing portion 80 is mounted to the body 20 by screwing the tubular portion 82 into the second large diameter portion 24.

The sealing portion 80 seals another end of the tubular inner wall 21, namely an opening formed on the outer wall of the housing 11. The tubular portion 82 of the sealing portion 80 is located at an outer side in the radial direction of another end of the tubular portion 71, and then a space having a tubular shape is formed between the tubular portion 82 of the sealing portion 80 and the outer wall of the tubular portion 71. A space is formed between the bottom 72 of the spring seat 70 and the sealing portion 80. With this, the space inside the tubular portion 71 of the spring seat 70 is communicated with the second space 102 (the space in the fuel chamber 15) via the hole 73, a space between the bottom 72 and the sealing portion 80, the space having a tubular shape between the tubular portion 82 and the tubular portion 71, and the second hole 27. With this, a reciprocal moving in the axial direction of the valve member 50 in the body 20 can be performed smoothly.

The valve opening pressure of the relief valve 1 (the valve member 50) is set based on the biasing force of the biasing member 60 and the fuel pressure in the space in the valve member 50 at a side of the spring seat 70 among the inside space 103 (the fuel pressure in the fuel chamber 15).

Next, a relationship between a relative position of the valve member 50 against the tubular inner wall 21, an overlap area Sp that is an area in which the hole opening 26 and the slide outer wall 55 are overlapped with each other, and a minimum passage area Sf that is a passage area between the intermediate chamber 104 and the first hole 25 being minimum, is described with reference to FIGS. 1A, 1B, and 4A to 4C.

As shown in FIG. 1B, in the present embodiment, a gap area Ss that is a sectional area in a direction orthogonal to the axis of a tubular gap formed between the reference inner diameter portion 22 of the body 20 and the small diameter portion 54 of the valve member 50, is set to be larger than an opening area So of an area of the hole opening 26. That is, the body 20, the valve member 50, and the hole opening 26 are formed to fulfill a relation of Ss>So.

Figure 4A:
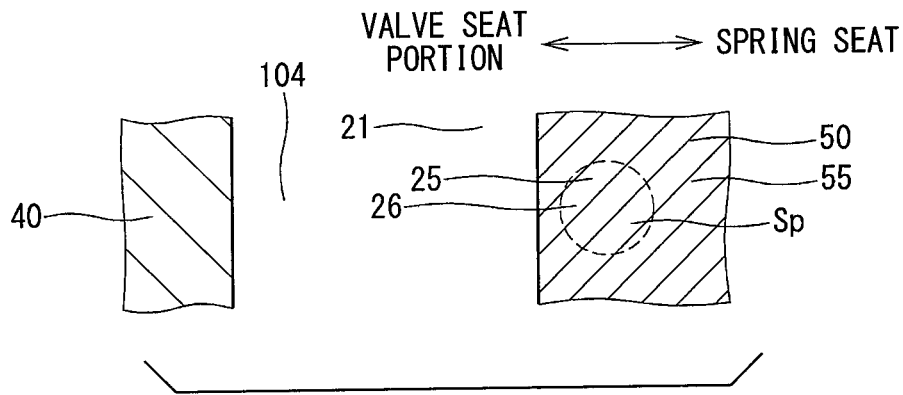
FIG. 4A is a cross-sectional view near a hole of the relief valve according to the first embodiment of the present disclosure, illustrating a state in which the seat is contacted with the valve seat.
Figure 4B:
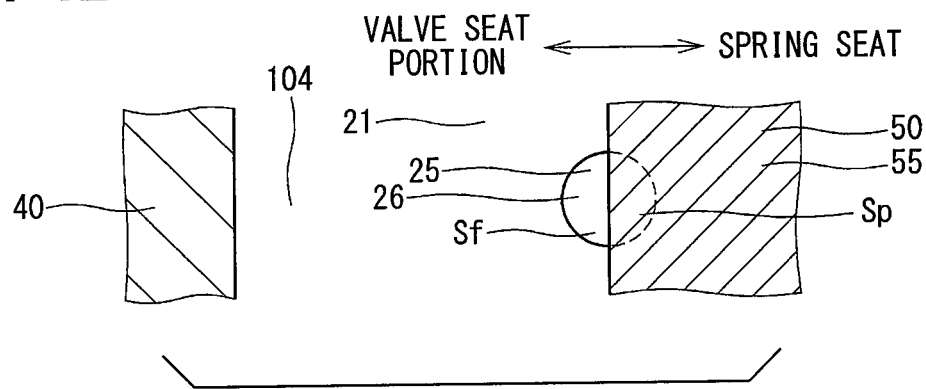
FIG. 4B is a cross-sectional view near the hole of the relief valve according to the first embodiment of the present disclosure, illustrating a state in which the seat is separated from the valve seat.
Figure 4C:
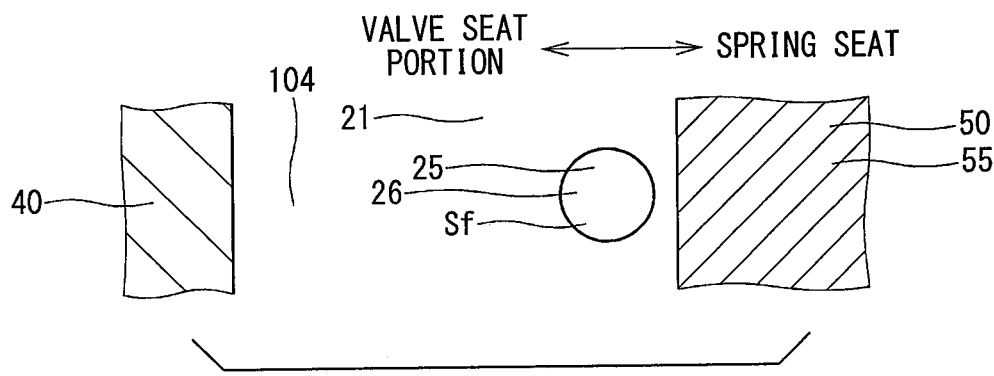
FIG. 4C is a cross-sectional view near the hole of the relief valve according to the first embodiment of the present disclosure, illustrating a state in which the seat is separated from the valve seat and a valve member is contacted with a moving restriction portion.

FIGS. 4A to 4C show a part near the first hole 25 in a cross-sectional view of the relief valve 1 for describing a positional relationship between the slide outer wall 55 and the hole opening 26. FIG. 4 corresponds to a cross-sectional view taken along a line IVA-IVA in FIG. 1A.

As shown in FIG. 4A, the hole opening 26 and the slide outer wall 55 are completely overlapped with each other in a state in which the seat 58 of the valve member 50 is contacted with the valve seat 42. Thus, the overlap area Sp, which is the area in which the hole opening 26 and the slide outer wall 55 are overlapped with each other, is equal to the opening area So (an area of the hole opening 26). At this time, the minimum passage area Sf, which is the passage area between the intermediate chamber 104 and the first hole 25 being minimum, is equal to "0".

As shown in FIG. 4B, when the seat 58 of the valve member 50 is separated from the valve seat 42 and the valve member 50 is further moved toward the spring seat 70, the overlap area Sp becomes smaller than the opening area So. At this time, the minimum passage area Sf is equal to a difference between the opening area So and the overlap area Sp.

As shown in FIG. 4C, when the valve member 50 is further moved toward the spring seat 70 and the tubular portion 52 is contacted with the moving restriction portion 74, the overlap area Sp is equal to "0". At this time, the minimum passage area Sf is equal to the opening area So.

Figure 5:
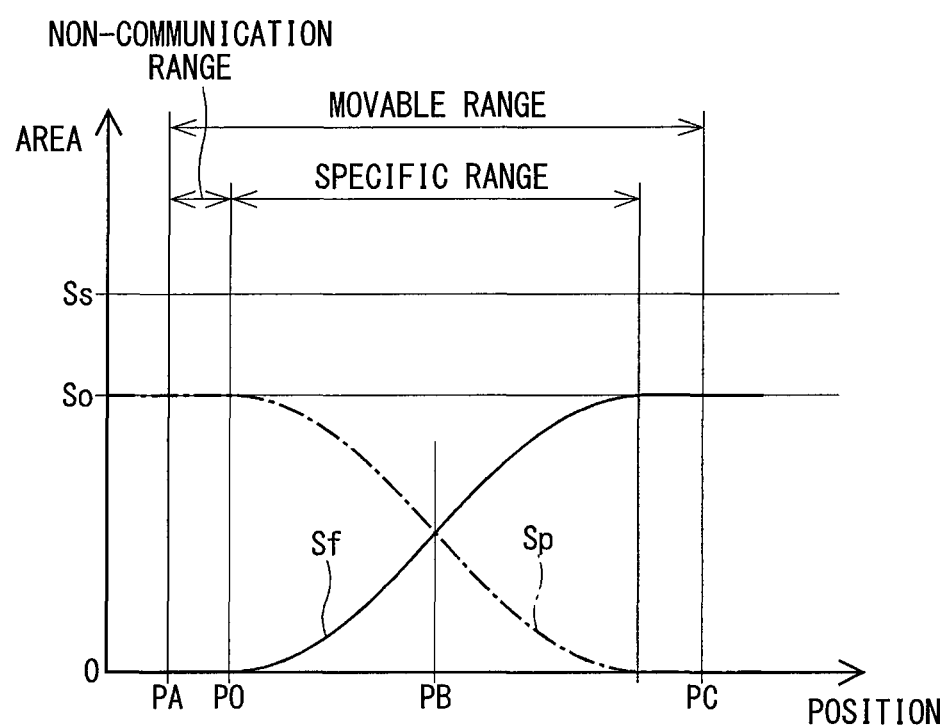
FIG. 5 is a graph for describing a characteristic of the relief valve according to the first embodiment of the present disclosure, illustrating a relationship between a relative position of the valve member against a tubular inner wall, an overlap area between a hole opening and a slide outer wall, and a minimum passage area between an intermediate chamber and a hole.

FIG. 5 shows the relationship between the relative position of the valve member 50 against the tubular inner wall 21, the overlap area Sp between the hole opening 26 and the slide outer wall 55, and the minimum passage area Sf between the intermediate chamber 104 and the first hole 25.

In FIG. 5, a position PA indicates the relative position of the valve member 50 against the tubular inner wall 21 in a case shown in FIG. 4A. A position PB indicates the relative position of the valve member 50 against the tubular inner wall 21 in a case shown in FIG. 4B. A position PC indicates the relative position of the valve member 50 against the tubular inner wall 21 in a case shown in FIG. 4C. The overlap area Sp is illustrated by a dashed line, and the minimum passage area Sf is illustrated by a solid line.

As shown in FIG. 5, when the valve member 50 is positioned at the position PA, the minimum passage area Sf is equal to "0". When the valve member 50 is positioned at the position PC, the minimum passage area Sf is equal to the opening area So.

As shown in FIG. 5, in the present embodiment, the valve member 50 includes at least "a specific range in which the overlap area Sp that is the area in which the hole opening 26 and the slide outer wall 55 are overlapped with each other, becomes gradually (continuously) smaller and the minimum passage area Sf, which is the passage area between the intermediate chamber 104 and the first hole 25 being minimum, becomes gradually (continuously) larger as the valve member 50 is moved in a direction away from the valve seat portion 40" in a movable range in the axial direction. In other words, the valve member 50 includes at least "the specific range in which the overlap area Sp between the hole opening 26 and the slide outer wall 55 is asymptotically decreased and the minimum passage area Sf between the intermediate chamber 104 and the first hole 25 is asymptotically increased as the valve member 50 is moved in a direction away from the valve seat portion 40" in the movable range in the axial direction.

In the present embodiment, when the fuel pressure in the first space 101 exceeds the valve opening pressure and then the seat 58 is separated from the valve seat 42 to open the valve member 50 and the fuel pressure in the intermediate chamber 104 communicated with the first space 101 is increased, the valve member 50 is moved in a direction away from the valve seat portion 40. In "the specific range" described above, since the minimum passage area Sf between the intermediate chamber 104 and the first hole 25 becomes larger as the valve member 50 is separated further from valve seat portion 40, the flow amount of the fuel flowing from the intermediate chamber 104 to the first hole 25 becomes larger as the fuel pressure in the intermediate chamber 104 becomes larger.

In the present embodiment, when the valve member 50 is moved in the direction close to the valve seat portion 40, in "the specific range" described above, the overlap area Sp between the hole opening 26 and the slide outer wall 55 is gradually increased and the minimum passage area Sf between the intermediate chamber 104 and the first hole 25 is gradually decreased. Thus, the fuel flows from the intermediate chamber 104 to the first hole 25 and then the fuel pressure in the intermediate chamber 104 is decreased, and when the valve member 50 is moved toward the valve seat portion 40, the flow of the fuel from the intermediate chamber 104 to the first hole 25 is gradually throttled.

As described above, in the present embodiment, when the seat 58 is contacted with the valve seat 42 (the position PA), the overlap area Sp between the hole opening 26 and the slide outer wall 55 is equal to the opening area So of the hole opening 26, and the minimum passage area Sf between the intermediate chamber 104 and the first hole 25 is equal to zero, namely, the intermediate chamber 104 and the first hole 25 are not communicated with each other. The intermediate chamber 104 and the first hole 25 are not communicated with each other during a period in which the valve member 50 is moved from the position PA to the position PO shown in FIG. 5. That is, in the present embodiment, the valve member 50 includes "a non-communication range that is a range in which the intermediate chamber 104 and the first hole 25 are not communicated with each other" in the movable range in the axial direction (see FIG. 5).

Next, operation of the high pressure pump 10 according to the present embodiment will be described with reference to FIG. 2.

[Suction Process]

When supply of the electric power to the driving portion 18 is interrupted, the valve body 162 of the suction valve 16 is biased toward the pressurizing chamber 12 by the driving portion 18. Thus, the valve body 162 is separated from the valve seat 161, namely the suction valve 16 is opened. In this state, when the plunger 19 is moved toward the cam 9, the volume of the pressurizing chamber 12 is increased and the fuel in the suction passage 13 is suctioned into the pressurizing chamber 12.

[Metering Process]

When the plunger 19 is moved to a side opposite to the cam 9 in a state in which the suction valve 16 is opened, the volume of the pressurizing chamber 12 is decreased, and the fuel in the pressurizing chamber 12 is returned into the suction passage 13. In the middle of the metering process, when the electric power is supplied to the driving portion 18, the suction valve 16 is closed. When the plunger 19 is moved to the side opposite to the cam 9, an amount of the fuel returned from the pressurizing chamber 12 to the suction passage 13 is adjusted by closing the suction valve 16 and interrupting the pressurizing chamber 12 and the suction passage 13. As a result, the amount of the fuel pressurized in the pressurizing chamber 12 is determined. When the suction valve 16 is closed, the metering process in which the fuel is returned from the pressurizing chamber 12 to the suction passage 13 is ended.

[Pressurizing Process]

When the plunger 19 is further moved to the side opposite to the cam 9 in a state in which the suction valve 16 is closed, the volume of the pressurizing chamber 12 is decreased and then the fuel in the pressurizing chamber 12 is compressed and pressurized. When the fuel pressure in the pressurizing chamber 12 exceeds the valve opening pressure of the discharge valve 17, the discharge valve 17 is opened and the fuel is discharged from the pressurizing chamber 12 to the discharge passage 14 (the first space 101).

When the supply of the electric power to the driving portion 18 is interrupted and the plunger 19 is moved toward the cam 9, the suction valve 16 is opened again. With this, the pressurizing process in which the fuel is pressurized is ended and the suction process in which the fuel is suctioned from the suction passage 13 to the pressurizing chamber 12 is started again.

By repeating "the suction process", "the metering process", and "the pressurizing process" described above, the high pressure pump 10 pressurizes and discharges the fuel suctioned into the fuel tank 2 and supplies the fuel to the fuel rail 6. A supplied amount of the fuel from the high pressure pump 10 to the fuel rail 6 is adjusted by controlling supply timing of the electric power to the driving portion 18 or the like.

For example, when a state in which the supply of the electric power to the driving portion 18 is interrupted is continued for a predetermined period, the valve opening state of the suction valve 16 is kept, and then the pressurizing of the fuel in the pressurizing chamber 12 is not performed, and the fuel is not supplied from the high pressure pump 10 to the fuel rail 6. Also in a case in which the valve opening state of the suction valve 16 is kept due to some cause such as fixing of the valve body 162, the pressurizing of the fuel in the pressurizing chamber 12 is not performed and the fuel is not supplied from the high pressure pump 10 to the fuel rail 6.

On the other hand, for example, when the supply of the electric power to the driving portion 18 is continued for the predetermined period, the suction valve 16 is closed in the pressurizing process, and therefore the fuel is pressurized in the pressurizing chamber 12 and supplied from the high pressure pump 10 to the fuel rail 6, and then the fuel pressure in the discharge passage 14, the pipe 5, and the fuel rail 6 is increased. Also in a case in which the valve closing state of the suction valve 16 is kept due to some cause such as the fixing of the valve body 162, the fuel is pressurized in the pressurizing chamber 12 and supplied from the high pressure pump 10 to the fuel rail 6, and then the fuel pressure in the discharge passage 14, the pipe 5, and the fuel rail 6 is increased.

Next, operation of the relief valve 1 according to the present embodiment will be described with reference to FIGS. 1A and 1B.

When the fuel pressure in the discharge passage 14 (the first space 101) exceeds the valve opening pressure of the relief valve 1 (the valve member 50), the seat 58 is separated from the valve seat 42 and the relief valve 1 is opened, and then the fuel pressure in the intermediate chamber 104 communicated with the first space 101 is increased. With this, the valve member 50 is moved in the direction away from the valve seat portion 40.

When the valve member 50 is further moved in the direction away from the valve seat portion 40, the intermediate chamber 104 and the first hole 25 are communicated with each other via the hole opening 26. With this, the fuel flows from the intermediate chamber 104 to the first hole 25. The fuel flowing to the first hole 25 flows toward the fuel chamber 15.

When the fuel pressure in the intermediate chamber 104 is further increased and the valve member 50 is further moved in the direction away from the valve seat portion 40, the minimum passage area Sf between the intermediate chamber 104 and the first hole 25 becomes larger. Accordingly, the fuel is apt to flow from the intermediate chamber 104 to the first hole 25. With this, the fuel pressure in the intermediate chamber 104 and the discharge passage 14 (the first space 101) communicated with the intermediate chamber 104 is decreased quickly.

When the fuel pressure in the intermediate chamber 104 is decreased, the valve member 50 is moved in the direction close to the valve seat portion 40. When the valve member 50 is moved in the direction close to the valve seat portion 40, the minimum passage area Sf between the intermediate chamber 104 and the first hole 25 becomes gradually smaller. Accordingly, the flow of the fuel from the intermediate chamber 104 to the first hole 25 is gradually throttled. Thus, the fuel pressure in the intermediate chamber 104 is suppressed to be decreased drastically, and the pressure is kept at a predetermined valve or more. At this time, the valve member 50 is suppressed to be moved quickly toward the valve seat portion 40. With this, the valve member 50 is kept at a position at which the minimum passage area Sf is larger than zero, and the valve opening state in which the valve member 50 is separated from the valve seat 42 is kept.

When the fuel pressure in the discharge passage 14 (the first space 101) is further decreased and the minimum passage area Sf becomes substantially zero and the fuel flowing from the discharge passage 14 to the fuel chamber 15 (the second space 102) via the intermediate chamber 104 becomes substantially zero, the seat 58 is contacted with the valve seat 42, and the relief valve 1 is closed.

In the present embodiment, in "the specific range", since the minimum passage area Sf between the intermediate chamber 104 and the first hole 25 becomes larger as the valve member 50 is separated further from the valve seat portion 40, the flow amount of the fuel flowing from the intermediate chamber 104 to the first hole 25 becomes larger as the fuel pressure in the intermediate chamber 104 becomes larger. With this, the fuel pressure in the first space 101 (the space in the discharge passage 14) communicated with the intermediate chamber 104 can be decreased quickly.

In the present embodiment, when the valve member 50 is moved in the direction close to the valve seat portion 40, the overlap area Sp between the hole opening 26 and the slide outer wall 55 becomes gradually larger and the minimum passage area Sf between the intermediate chamber 104 and the first hole 25 becomes gradually smaller in "the specific range". Thus, the fuel flows from the intermediate chamber 104 to the first hole 25 and whereby the fuel pressure in the intermediate chamber 104 is decreased, and when the valve member 50 is moved toward the valve seat portion 40, the flow of the fuel from the intermediate chamber 104 to the first hole 25 is gradually throttled. With this, it is suppressed that "the flow of the fuel from the intermediate chamber 104 to the first hole 25 is throttled drastically and the fuel pressure in the intermediate chamber 104 is drastically increased again". Accordingly, when the fuel pressure in the first space 101 is decreased, generation of pressure pulsation in the fuel in the intermediate chamber 104 and the fuel in the first space 101 (the space in the discharge passage 14) communicated with the intermediate chamber 104 can be suppressed.

As described above, in the relief valve 1 according to the present embodiment, the valve member 50 includes at least "the specific range in which the overlap area Sp, which is the area in which the hole opening 26 and the slide outer wall 55 are overlapped with each other, becomes gradually smaller and the minimum passage area Sf, which is the passage area between the intermediate chamber 104 and the first hole 25 being minimum, becomes gradually larger as the valve member 50 is moved in the direction away from the valve seat portion 40" in the movable range in the axial direction.

In the present embodiment, when the fuel pressure in the first space 101 exceeds the valve opening pressure of the valve member 50 and the seat 58 is separated from the valve seat 42 to open the valve member 50 and the fuel pressure in the intermediate chamber 104 communicated with the first space 101 is increased, the valve member 50 is moved in the direction away from the valve seat portion 40. In "the specific range" described above, since the minimum passage area Sf between the intermediate chamber 104 and the first hole 25 becomes larger as the valve member 50 is separated further from valve seat portion 40, the flow amount of the fuel flowing from the intermediate chamber 104 to the first hole 25 becomes larger as the fuel pressure in the intermediate chamber 104 becomes larger. With this, the fuel pressure in the first space 101 communicated with the intermediate chamber 104 can be decreased quickly.

In the present embodiment, when the valve member 50 is moved in the direction close to the valve seat portion 40, in "the specific range" described above, the overlap area Sp between the hole opening 26 and the slide outer wall 55 is gradually increased and the minimum passage area Sf between the intermediate chamber 104 and the first hole 25 is gradually decreased. Thus, the fuel flows from the intermediate chamber 104 to the first hole 25 and then the fuel pressure in the intermediate chamber 104 is decreased, and when the valve member 50 is moved toward the valve seat portion 40, the flow of the fuel from the intermediate chamber 104 to the first hole 25 is gradually throttled. With this, it is suppressed that "the flow of the fuel from the intermediate chamber 104 to the first hole 25 is throttled drastically and the fuel pressure in the intermediate chamber 104 is drastically increased again". Accordingly, when the fuel pressure in the first space 101 is decreased, the generation of the pressure pulsation in the fuel in the intermediate chamber 104 and the fuel in the first space 101 communicated with the intermediate chamber 104 can be suppressed.

In the relief valve 1 according to the present embodiment, when the seat 58 is contacted with the valve seat 42, the intermediate chamber 104 and the first hole 25 are not communicated with each other. The valve member 50 includes "the non-communication range that is the range in which the intermediate chamber 104 and the first hole 25 are not communicated with each other" in the movable range in the axial direction. Thus, in the non-communication range, the valve member 50 is moved in the direction away from the valve seat portion 40 quickly in association with the increase of the fuel pressure in the intermediate chamber 104. The valve opening state of the valve member 50 (in the specific range), which is opened once, can be kept easily (to be hardly closed).

The relief valve 1 according to the present embodiment further includes the moving restriction portion 74 that can restrict the valve member 50 to move in the direction away from the valve seat portion 40. With this, the valve member 50 can be suppressed to be away extremely from the valve seat portion 40, and damage (buckling) or the like of the biasing member 60 can be suppressed.

In the present embodiment, a maximum value of the minimum passage area Sf between the intermediate chamber 104 and the first hole 25 is equal to the opening area So of the hole opening 26, however the maximum value of the minimum passage area Sf can be set in any value equal to or smaller than the opening are So by appropriately setting the position of the moving restriction portion 74.

In the relief valve 1 according to the present embodiment, the hole opening 26 is formed in a circular shape. Thus, the relationship between the relative position of the valve member 50 against the tubular inner wall 21, the overlap area Sp between the hole opening 26 and the slide outer wall 55, and the minimum passage area Sf between the intermediate chamber 104 and the first hole 25 is set as shown in FIG. 5.

The high pressure pump 10 according to the present embodiment includes: the housing 11 having the pressurizing chamber 12 that suctions and pressurizes the fuel, the suction passage 13 in which the fuel suctioned in the pressurizing chamber 12 flows, and the discharge passage 14 in which the fuel pressurized in the pressurizing chamber 12 and discharged flows; and the relief valve 1 described above. The first space 101 is formed as a space in the discharge passage 14. Accordingly, when the fuel pressure in the discharge passage 14 (the first space 101) communicated with the intermediate chamber 104 becomes high, the pressure can be decreased quickly. When the fuel pressure in the discharge passage 14 (the first space 101) is decreased, the pressure pulsation is suppressed to be generated in the fuel in the discharge passage 14 (the first space 101). With this, the damage of the pipe 5 that connects the discharge passage 14 of the high pressure pump 10 and the fuel rail 6 can be suppressed.

In the present embodiment, the second space 102 is formed as a space in the fuel chamber 15 communicated with the suction passage 13. That is, the relief valve 1 is arranged such that the valve hole 41 is communicated with the discharge passage 14 and the first hole 25 is communicated with the fuel chamber 15. In the relief valve 1, when the fuel pressure in the discharge passage 14 exceeds the valve opening pressure of the relief valve 1, the fuel in the discharge passage 14 is returned to the side of the fuel chamber 15 having low pressure and the fuel pressure in the discharge passage 14 is decreased.

The high pressure pump 10 according to the present embodiment includes the discharge valve 17 arranged between the pressurizing chamber 12 and the discharge passage 14 and formed to allow or restrict the flow of the fuel between the pressurizing chamber 12 and the discharge passage 14. The high pressure pump 10 includes the suction valve 16 arranged between the pressurizing chamber 12 and the suction passage 13 and formed to allow or restrict the flow of the fuel between the pressurizing chamber 12 and the suction passage 13. The high pressure pump 10 includes the driving portion 18 that can change the valve opening state of the suction valve 16.

In the present embodiment, in the relief valve 1, a space at a back pressure side (a space of the valve member 50 at a side of the spring seat 70) is formed to be connected to the fuel chamber 15 having low pressure via the second hole 27. Thus, degree of freedom of the setting of the valve opening pressure of the relief valve 1 (the valve member 50) can be made large. In the present embodiment, since the hole opening 26 is closed by the slide outer wall 55 when the valve member 50 is closed, an influence of the fuel pressure in the first hole 25 to the valve opening pressure of the valve member 50 can be suppressed.

Since the relief valve disclosed in Patent Literature 1 described above has a space at a back pressure side (a space of the valve body and the movable holder at a side of the biasing member) so as to connect to the pressurizing chamber of the high pressure pump, dead volume of the pressurizing chamber of the high pressure pump is increased and sufficient pressurizing of the fuel by the high pressure pump might be difficult. However, in the high pressure pump 10 according to the present embodiment, the relief valve 1 has the space at the back pressure side (the space of the valve member 50 at the side of the spring seat 70) so as to connect to the fuel chamber 15. Thus, increase of dead volume of the pressurizing chamber 12 is suppressed, and sufficient pressurizing of the fuel by the high pressure pump 10 can be performed.

In the relief valve disclosed in Patent Literature 1, since the valve body contacted with the valve seat is formed separately from the movable holder biased by the biasing member. Accordingly, operation failure of the relief valve might occur when the position between the valve body and the movable holder is deviated. However, in the relief valve 1 according to the present embodiment, the seat 58 contacted with the valve seat 42 is formed integrally with the valve body 51 biased by the biasing member 60. Thus, the position between the seat 58 and the valve body 51 is not deviated.

In the relief valve disclosed in Patent Literature 1, the movable holder might be dropped off from the guide hole when differential pressure between the fuel pressure in the pressurizing chamber and the fuel pressure in the discharge passage is large. When the movable holder is dropped off from the guide hole, it might be difficult that the movable holder is entered into the guide hole again. In this case, the valve body cannot be pressed against the valve seat, and therefore the relief valve might not be closed. However, in the relief valve 1 according to the present embodiment, the slide outer wall 55 can be always slide on the tubular inner wall 21 in the valve member 50 regardless of the position of the valve member 50 in the axial direction in the body 20, the moving in the axial direction of the valve member 50 is stabled. The relief valve 1 according to the present embodiment is not set in a state in which the relief valve cannot be closed as described in the relief valve disclosed in Patent Literature 1.

In the relief valve disclosed in Patent Literature 1, the outer circumference surface of the biasing member that biases the movable holder faces the passage that connects the discharge passage and the pressurizing chamber. Thus, when the fuel pressure in the discharge passage is decreased, the fuel flowing from the discharge passage toward the pressurizing chamber is contacted with the outer circumference surface of the end of the biasing member especially at a side of the movable holder, and the position of the movable holder might be unstable. However, in the relief valve 1 according to the present embodiment, the outer circumference surface of the end of the biasing member 60 at the side of the valve member 50 is covered by the tubular portion 52. The outer circumference surface of the biasing member 60 does not face the passage that connects the discharge passage 14 and the fuel chamber 15. Thus, in the present embodiment, when the fuel pressure in the discharge passage 14 is decreased, the fuel flowing from the discharge passage 14 toward the fuel chamber 15 is not contacted with the outer circumference surface of the biasing member 60. With this, the position of the valve member 50 can be stable.

In the present embodiment, the body 20 of the relief valve 1 is formed integrally with the housing 11 of the high pressure pump 10. With this, the number of the parts can be decreased.

Second Embodiment

FIGS. 6A to 6C, and 7 show a relief valve according to a second embodiment of the present disclosure. In the second embodiment, a shape of a hole opening 26 formed on a tubular inner wall 21 of a body 20 is different from that in the first embodiment.

Figure 6A:
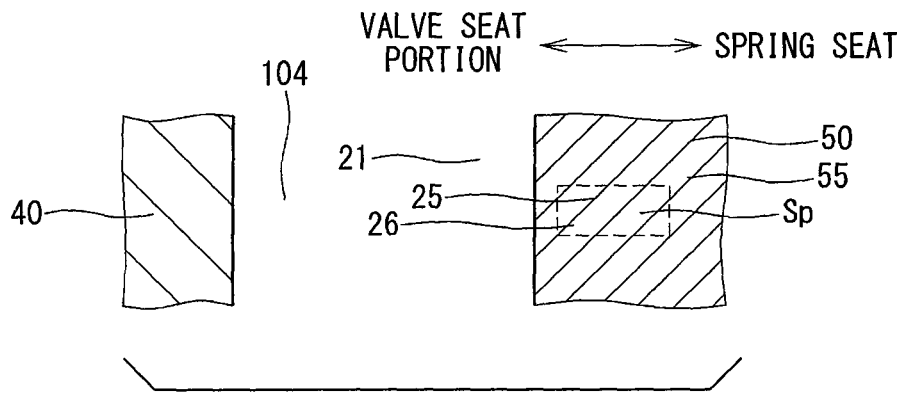
FIG. 6A is a cross-sectional view near a hole of a relief valve according to a second embodiment of the present disclosure, illustrating a state in which a seat is contacted with a valve seat.

As shown in FIG. 6A, in the present embodiment, the hole opening 26 is formed in a rectangular shape. The hole opening 26 is formed in a rectangular shape in which a longitudinal direction thereof is parallel to an axial direction of a slide outer wall 55.

As shown in FIG. 6A, the hole opening 26 and the slide outer wall 55 are completely overlapped with each other in a state in which a seat 58 of a valve member 50 is contacted with a valve seat 42. Thus, an overlap area Sp that is an area in which the hole opening 26 and the slide outer wall 55 are overlapped with each other is equal to an opening area So (an area of the hole opening 26). At this time, a minimum passage area Sf, which is a passage area between an intermediate chamber 104 and a first hole 25 being minimum, is equal to "0".

Figure 6B:
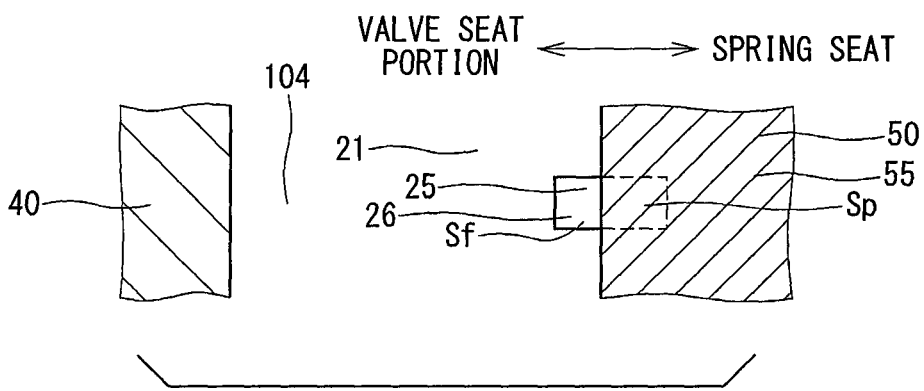
FIG. 6B is a cross-sectional view near the hole of the relief valve according to the second embodiment of the present disclosure, illustrating a state in which the seat is separated from the valve seat.

As shown in FIG. 6B, when the seat 58 of the valve member 50 is separated from the valve seat 42 and the valve member 50 is further moved toward a spring seat 70, the overlap area Sp becomes smaller than the opening area So. At this time, the minimum passage area Sf is equal to a difference between the opening area So and the overlap area Sp.

Figure 6C:
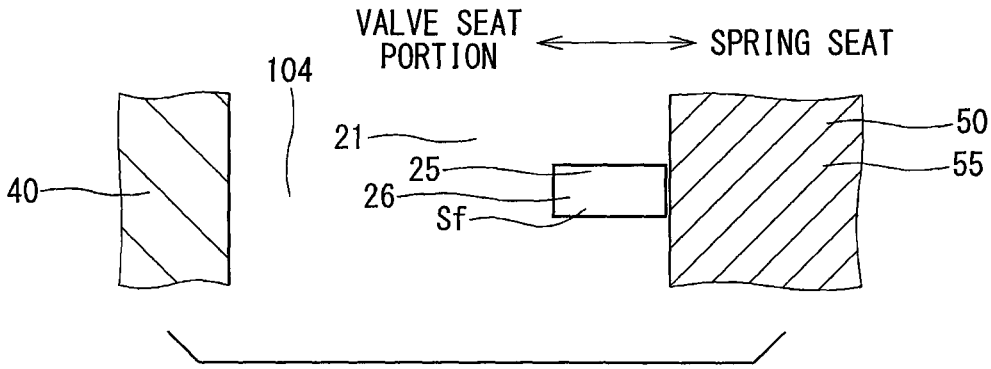
FIG. 6C is a cross-sectional view near the hole of the relief valve according to the second embodiment of the present disclosure, illustrating a state in which the seat is separated from the valve seat and a valve member is contacted with a moving restriction portion.

As shown in FIG. 6C, when the valve member 50 is further moved toward the spring seat 70 and a tubular portion 52 is contacted with a moving restriction portion 74, the overlap area Sp is equal to "0". At this time, the minimum passage area Sf is equal to the opening area So.

Figure 7:
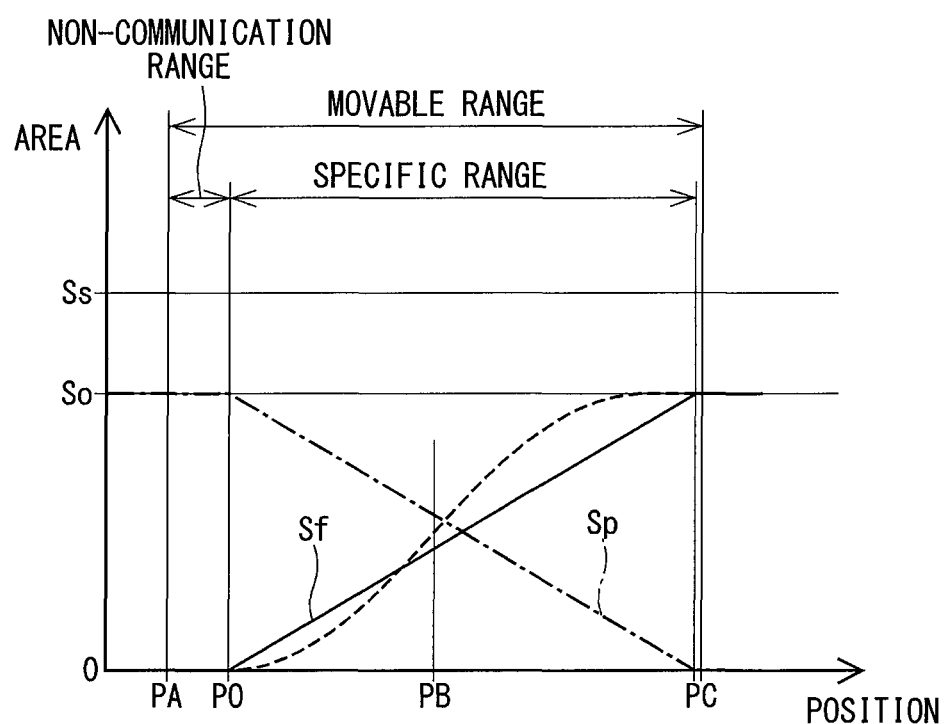
FIG. 7 is a graph for describing a characteristic of the relief valve according to the second embodiment of the present disclosure, illustrating a relationship between a relative position of the valve member against a tubular inner wall, an overlap area between a hole opening and a slide outer wall, and a minimum passage area between an intermediate chamber and a hole.

FIG. 7 shows a relationship between a relative position of the valve member 50 against the tubular inner wall 21, the overlap area Sp between the hole opening 26 and the slide outer wall 55, and the minimum passage area Sf between the intermediate chamber 104 and the first hole 25.

In FIG. 7, a position PA indicates the relative position of the valve member 50 against the tubular inner wall 21 in a case shown in FIG. 6A. A position PB indicates the relative position of the valve member 50 against the tubular inner wall 21 in a case shown in FIG. 6B. A position PC indicates the relative position of the valve member 50 against the tubular inner wall 21 in a case shown in FIG. 6C. The overlap area Sp is illustrated by a dashed line, and the minimum passage area Sf is illustrated by a solid line.

As shown in FIG. 7, when the valve member 50 is positioned at the position PA, the minimum passage area Sf is equal to "0". When the valve member 50 is positioned at the position PC, the minimum passage area Sf is equal to the opening area So.

As shown in FIG. 7, in the present embodiment, similar to the first embodiment, the valve member 50 includes at least "a specific range in which the overlap area Sp, which is the area in which the hole opening 26 and the slide outer wall 55 are overlapped with each other, becomes gradually smaller and the minimum passage area Sf, which is the passage area between the intermediate chamber 104 and the first hole 25 being minimum, becomes gradually larger as the valve member 50 is moved in a direction away from the valve seat portion 40" in a movable range in the axial direction.

The minimum passage area Sf between the intermediate chamber 104 and the first hole 25 according to the first embodiment is illustrated by a broken line in FIG. 7. In the specific range, as shown in FIG. 7, the minimum passage area Sf is changed (increased) in a curve manner (a sine wave manner) in accordance with the change of the position of the valve member 50 in the first embodiment, while the minimum passage area Sf is changed (increased) in a straight manner (a linear function manner) in accordance with the change of the position of the valve member 50 in the second embodiment. In the second embodiment, especially at a side of the position PA in the specific range, a change rate (incline) of the minimum passage area Sf in accordance with the change of the position of the valve member 50 is larger than that in the first embodiment. Thus, in the second embodiment, it is possible to allow the fuel in the intermediate chamber 104 to flow to the first hole 25 quickly, especially at the side of the position PA in the specific range, compared to the first embodiment.

Third Embodiment

FIGS. 8A to 8C, and 9 show a relief valve according to a third embodiment of the present disclosure. In the third embodiment, a shape of a hole opening 26 formed on a tubular inner wall 21 of a body 20 is different from that in the first embodiment.

Figure 8A:
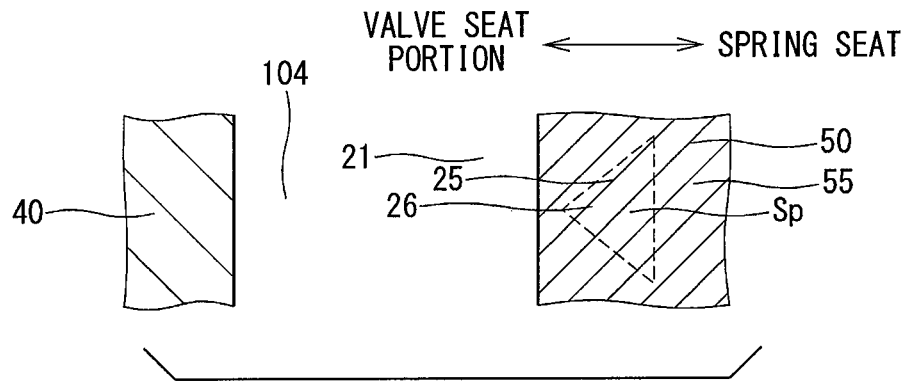
FIG. 8A is a cross-sectional view near a hole of a relief valve according to a third embodiment of the present disclosure, illustrating a state in which a seat is contacted with a valve seat.

As shown in FIG. 8A, in the present embodiment, the hole opening 26 is formed in a triangular shape. The hole opening 26 is formed such that one of apexes of the triangle is directed to a valve seat portion 40.

As shown in FIG. 8A, the hole opening 26 and the slide outer wall 55 are completely overlapped with each other in a state in which a seat 58 of a valve member 50 is contacted with a valve seat 42. Thus, an overlap area Sp that is an area in which the hole opening 26 and the slide outer wall 55 are overlapped with each other is equal to an opening area So (an area of the hole opening 26). At this time, a minimum passage area Sf, which is a passage area between an intermediate chamber 104 and a first hole 25 being minimum, is equal to "0".

Figure 8B:
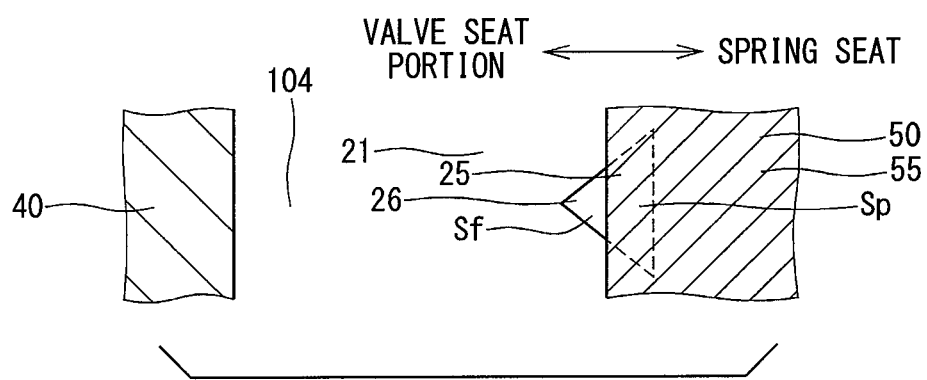
FIG. 8B is a cross-sectional view near the hole of the relief valve according to the third embodiment of the present disclosure, illustrating a state in which the seat is separated from the valve seat.

As shown in FIG. 8B, when the seat 58 of the valve member 50 is separated from the valve seat 42 and the valve member 50 is further moved toward a spring seat 70, the overlap area Sp becomes smaller than the opening area So. At this time, the minimum passage area Sf is equal to a difference between the opening area So and the overlap area Sp.

Figure 8C:
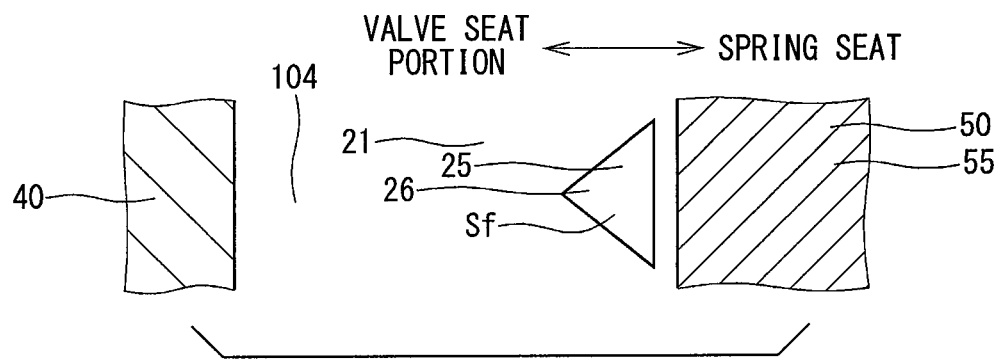
FIG. 8C is a cross-sectional view near the hole of the relief valve according to the third embodiment of the present disclosure, illustrating a state in which the seat is separated from the valve seat and a valve member is contacted with a moving restriction portion.

As shown in FIG. 8C, when the valve member 50 is further moved toward the spring seat 70 and a tubular portion 52 is contacted with a moving restriction portion 74, the overlap area Sp is equal to "0". At this time, the minimum passage area Sf is equal to the opening area So.

Figure 9:
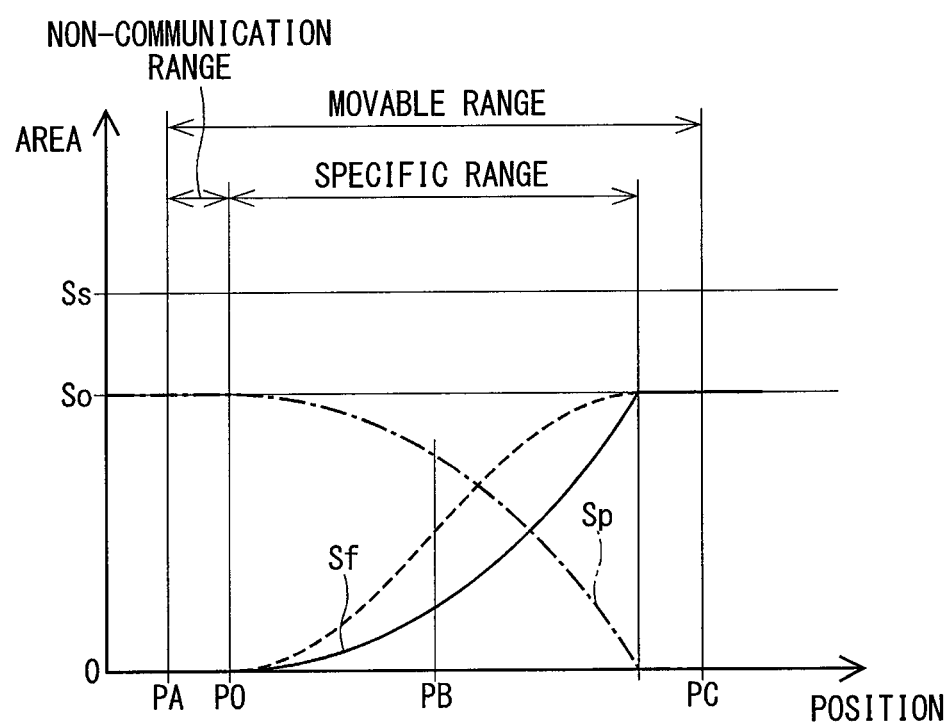
FIG. 9 is a graph for describing a characteristic of the relief valve according to the third embodiment of the present disclosure, illustrating a relationship between a relative position of the valve member against a tubular inner wall, an overlap area between a hole opening and a slide outer wall, and a minimum passage area between an intermediate chamber and a hole.

FIG. 9 shows a relationship between a relative position of the valve member 50 against the tubular inner wall 21, the overlap area Sp between the hole opening 26 and the slide outer wall 55, and the minimum passage area Sf between the intermediate chamber 104 and the first hole 25.

In FIG. 9, a position PA indicates the relative position of the valve member 50 against the tubular inner wall 21 in a case shown in FIG. 8A. A position PB indicates the relative position of the valve member 50 against the tubular inner wall 21 in a case shown in FIG. 8B. A position PC indicates the relative position of the valve member 50 against the tubular inner wall 21 in a case shown in FIG. 8C. The overlap area Sp is illustrated by a dashed line, and the minimum passage area Sf is illustrated by a solid line.

As shown in FIG. 9, when the valve member 50 is positioned at the position PA, the minimum passage area Sf is equal to "0". When the valve member 50 is positioned at the position PC, the minimum passage area Sf is equal to the opening area So.

As shown in FIG. 9, in the present embodiment, similar to the first embodiment, the valve member 50 includes at least "a specific range in which the overlap area Sp, which is the area in which the hole opening 26 and the slide outer wall 55 are overlapped with each other, becomes gradually smaller and the minimum passage area Sf, which is the passage area between the intermediate chamber 104 and the first hole 25 being minimum, becomes gradually larger as the valve member 50 is moved in a direction away from the valve seat portion 40" in a movable range in the axial direction.

The minimum passage area Sf between the intermediate chamber 104 and the first hole 25 according to the first embodiment is illustrated by a broken line in FIG. 9. In the specific range, as shown in FIG. 9, the minimum passage area Sf is changed (increased) in a curve manner (a sine wave manner) in accordance with the change of the position of the valve member 50 in the first embodiment, while the minimum passage area Sf is changed (increased) in a curve manner (a quadratic function manner) in accordance with the change of the position of the valve member 50 in the third embodiment. In the third embodiment, especially at a side of the position PA in the specific range, a change rate (incline) of the minimum passage area Sf in accordance with the change of the position of the valve member 50 is smaller than that in the first embodiment. Thus, in the third embodiment, it is possible to easily keep a valve opening state of the valve member 50 (hardly close the valve) that is opened once, compared to the first embodiment.

Fourth Embodiment

Figure 10A:
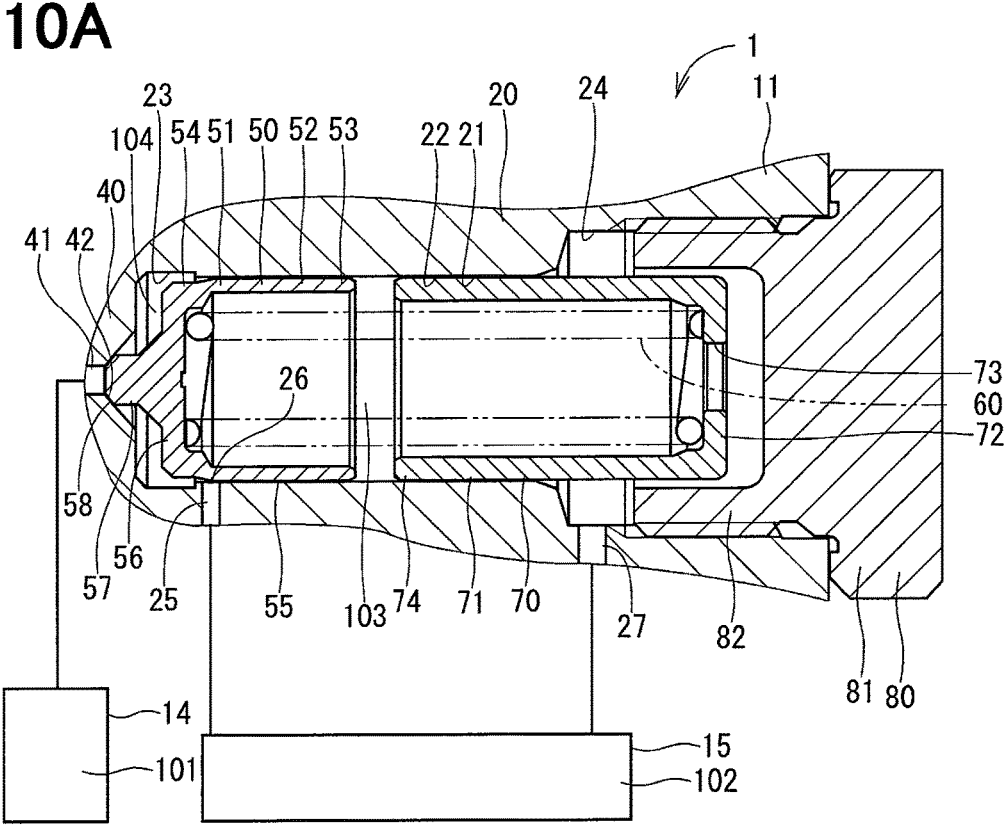
FIG. 10A is a cross-sectional view of a relief valve according to a fourth embodiment of the present disclosure, illustrating a state in which a seat is contacted with a valve seat.
Figure 10B:
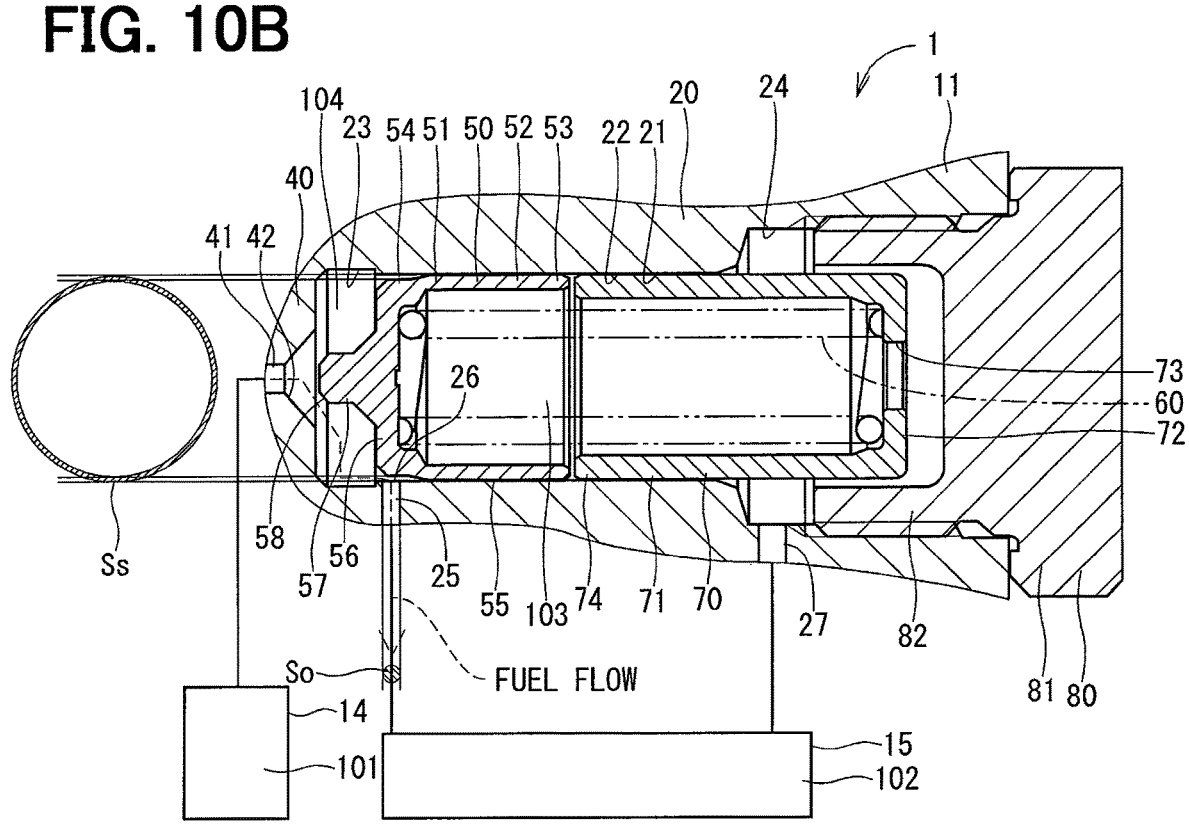
FIG. 10B is a cross-sectional view of the relief valve according to the fourth embodiment of the present disclosure, illustrating a state in which the seat is separated from the valve seat.

FIGS. 10A and 10B show a relief valve according to a fourth embodiment of the present disclosure. In the fourth embodiment, a position of a hole opening 26 (a first hole 25) formed on a tubular inner wall 21 of a body 20 is different from that in the first embodiment.

As shown in FIGS. 10A and 10B, in the fourth embodiment, the first hole 25 and the hole opening 26 are formed at a position closer to a valve seat portion 40 compared to those in the first embodiment. Thus, in the fourth embodiment, when a seat 58 is contacted with a valve seat 42, an intermediate chamber 104 and the first hole 25 are communicated with each other via the hole opening 26.

Next, a relationship between a relative position of a valve member 50 against the tubular inner wall 21, an overlap area Sp, which is an area in which the hole opening 26 and a slide outer wall 55 are overlapped with each other, and a minimum passage area Sf, which is a passage area between the intermediate chamber 104 and the first hole 25 being minimum in the fourth embodiment will be described with reference to FIGS. 11A to 11C, and 12.

Figure 11A:
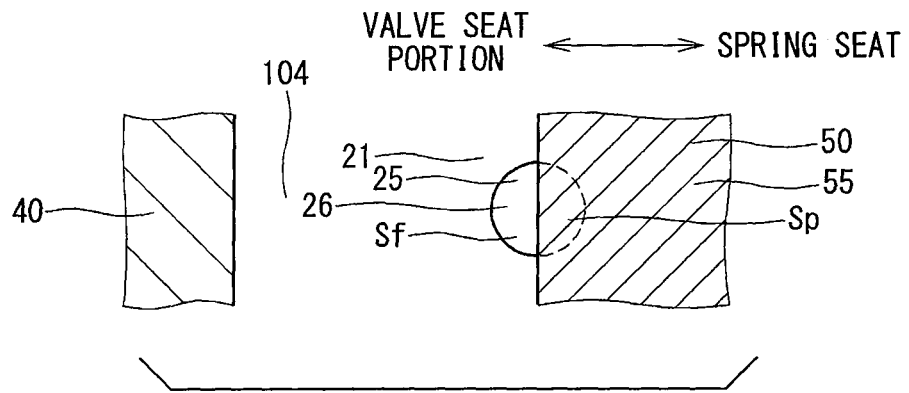
FIG. 11A is a cross-sectional view near a hole of the relief valve according to the fourth embodiment of the present disclosure, illustrating a state in which the seat is contacted with the valve seat.

As shown in FIG. 11A, the hole opening 26 and the slide outer wall 55 are partially overlapped with each other in a state in which the seat 58 of the valve member 50 is contacted with the valve seat 42. The overlap area Sp that is the area in which the hole opening 26 and the slide outer wall 55 are overlapped with each other is equal to approximately a half of an opening area So (an area of the hole opening 26). At this time, a minimum passage area Sf is equal to a difference between the opening area So and the overlap area Sp.

Figure 11B:
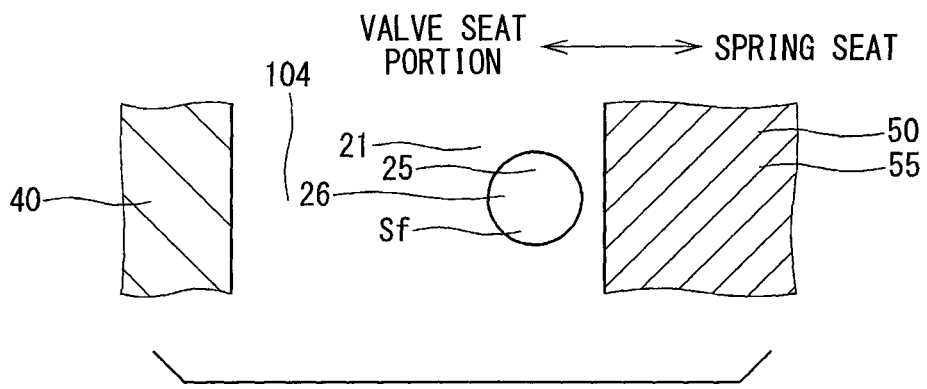
FIG. 11B is a cross-sectional view near the hole of the relief valve according to the fourth embodiment of the present disclosure, illustrating a state in which the seat is separated from the valve seat.

As shown in FIG. 11B, when the seat 58 of the valve member 50 is separated from the valve seat 42 and the valve member 50 is further moved toward a spring seat 70, the overlap area Sp is "0". At this time, the minimum passage area Sf is equal to the opening area So.

Figure 11C:
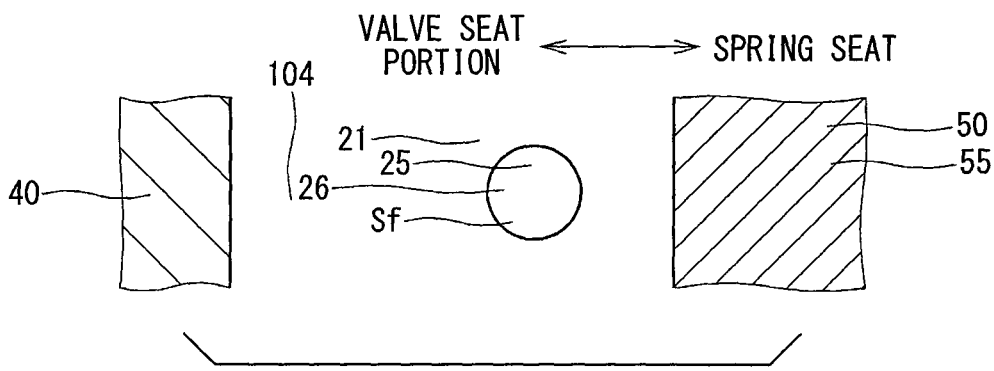
FIG. 11C is a cross-sectional view near the hole of the relief valve according to the fourth embodiment of the present disclosure, illustrating a state in which the seat is separated from the valve seat and a valve member is contacted with a moving restriction portion.

As shown in FIG. 11C, when the valve member 50 is further moved toward the spring seat 70 and a tubular portion 52 is contacted with a moving restriction portion 74, the overlap area Sp is equal to "0".

Figure 12:
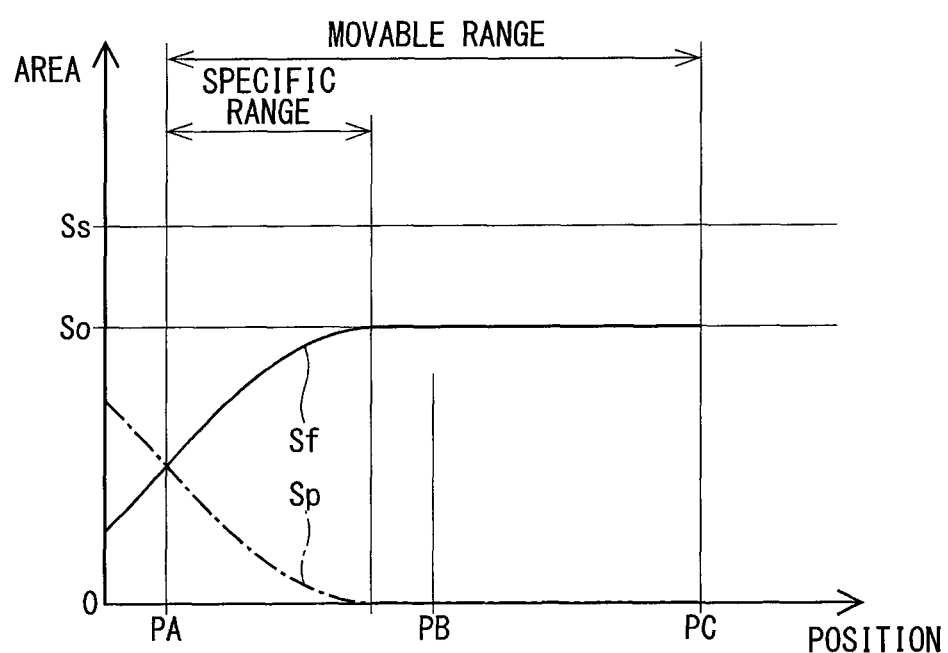
FIG. 12 is a graph for describing a characteristic of the relief valve according to the fourth embodiment of the present disclosure, illustrating a relationship between a relative position of the valve member against a tubular inner wall, an overlap area between a hole opening and a slide outer wall, and a minimum passage area between an intermediate chamber and a hole.

FIG. 12 shows the relationship between the relative position of the valve member 50 against the tubular inner wall 21, the overlap area Sp between the hole opening 26 and the slide outer wall 55, and the minimum passage area Sf between the intermediate chamber 104 and the first hole 25.

In FIG. 12, a position PA indicates the relative position of the valve member 50 against the tubular inner wall 21 in a case shown in FIG. 11A. A position PB indicates the relative position of the valve member 50 against the tubular inner wall 21 in a case shown in FIG. 11B. A position PC indicates the relative position of the valve member 50 against the tubular inner wall 21 in a case shown in FIG. 11C. The overlap area Sp is illustrated by a dashed line, and the minimum passage area Sf is illustrated by a solid line.

As shown in FIG. 12, when the valve member 50 is positioned at the position PA, the minimum passage area Sf is equal to approximately a half of the opening area So (the area of the hole opening 26). When the valve member 50 is positioned at the positions PB and PC, the minimum passage area Sf is equal to the opening area So.

As shown in FIG. 12, in the present embodiment, the valve member 50 includes at least "a specific range in which the overlap area Sp, which is the area in which the hole opening 26 and the slide outer wall 55 are overlapped with each other, becomes gradually smaller and the minimum passage area Sf, which is the passage area between the intermediate chamber 104 and the first hole 25 being minimum, becomes gradually larger as the valve member 50 is moved in a direction away from the valve seat portion 40" in a movable range in the axial direction.

In the present embodiment, contrary to the first embodiment, the valve member 50 does not include "a non-communication range that is a range in which the intermediate chamber 104 and the first hole 25 are not communicated with each other" in the movable range in the axial direction (see FIG. 12).

Fifth Embodiment

Figure 13A:
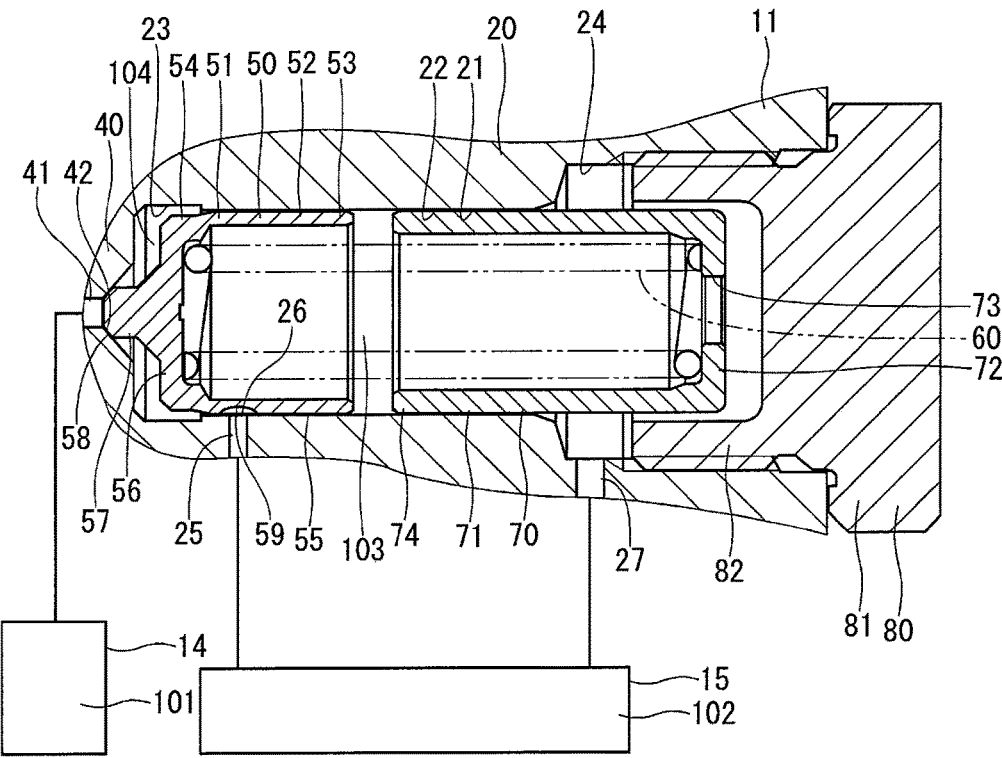
FIG. 13A is a cross-sectional view of a relief valve according to a fifth embodiment of the present disclosure, illustrating a state in which a seat is contacted with a valve seat.
Figure 13B:
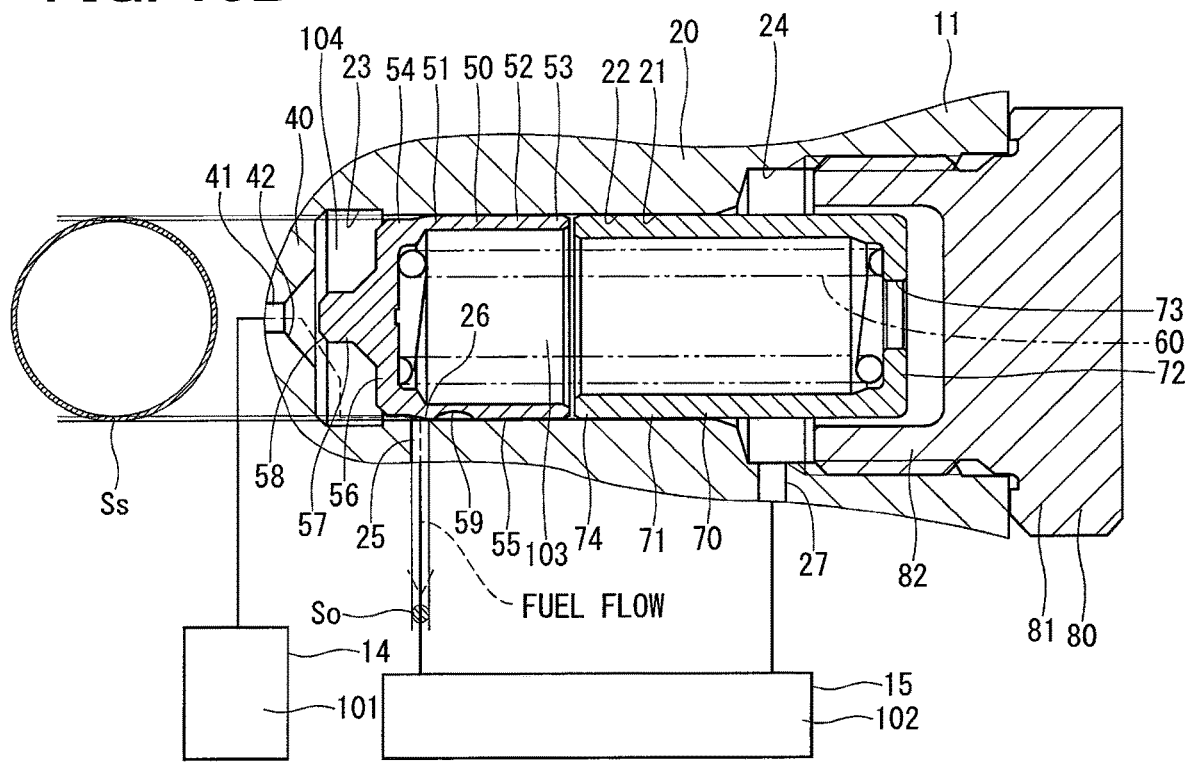
FIG. 13B is a cross-sectional view of the relief valve according to the fifth embodiment of the present disclosure, illustrating a state in which the seat is separated from the valve seat.

FIGS. 13A and 13B show a relief valve according to a fifth embodiment of the present disclosure. In the fifth embodiment, a shape of a tubular portion 52 of a valve member 50 is different from that in the first embodiment.

In the fifth embodiment, the valve member 50 has a concave portion 59. The concave portion 59 is formed to be recessed in a radial inner direction from a slide outer wall 55 at a position corresponding to a hole opening 26 in a state in which a seat 58 is contacted with a valve seat 42 (see FIG. 13A). Thus, an outer edge of the hole opening 26 is not slid on the slide outer wall 55 until the valve member 50 is moved in a direction away from the valve seat portion 40 at a predetermined distance from a state in which the seat 58 is contacted with the valve seat 42. Accordingly, wear of the outer edge of the hole opening 26 can be suppressed. Operation failure (valve opening failure) of the valve member 50 because of the slide outer wall 55 of the valve member 50 being hooked with the outer edge or an inner edge of the hole opening 26 can be suppressed.

First Reference Embodiment

Figure 14A:
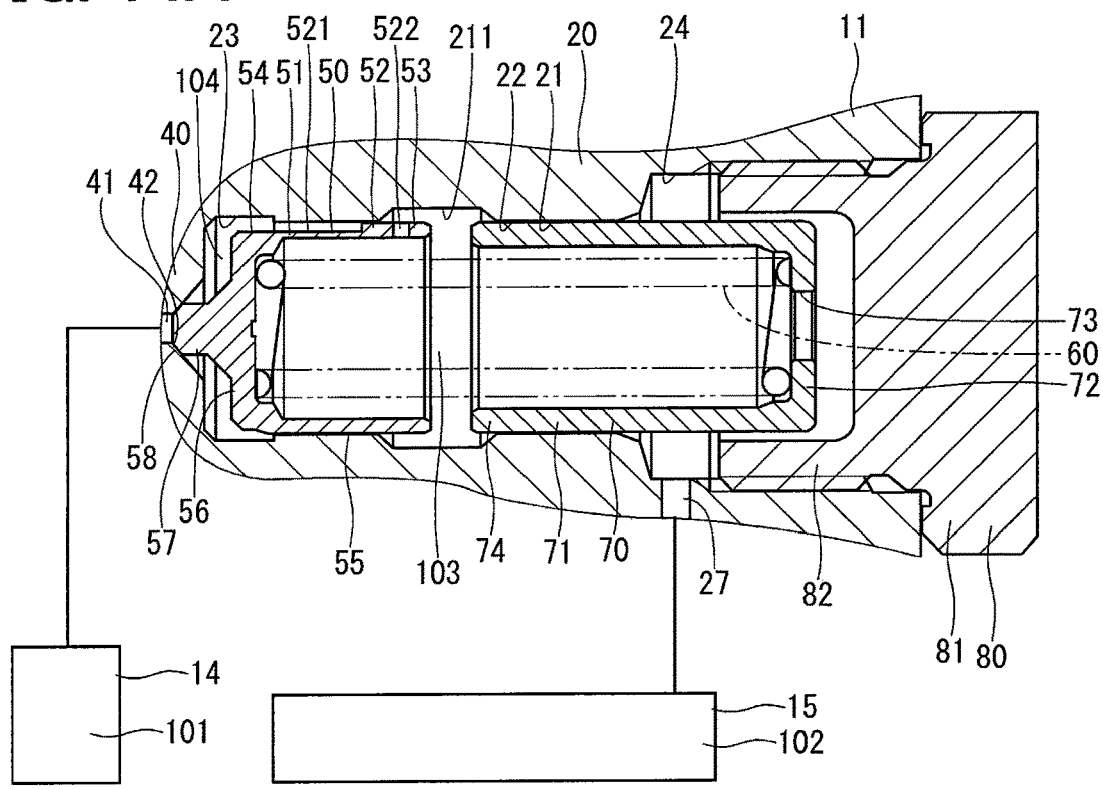
FIG. 14A is a cross-sectional view of a relief valve according to a first reference embodiment of the present disclosure, illustrating a state in which a seat is contacted with a valve seat.
Figure 14B:
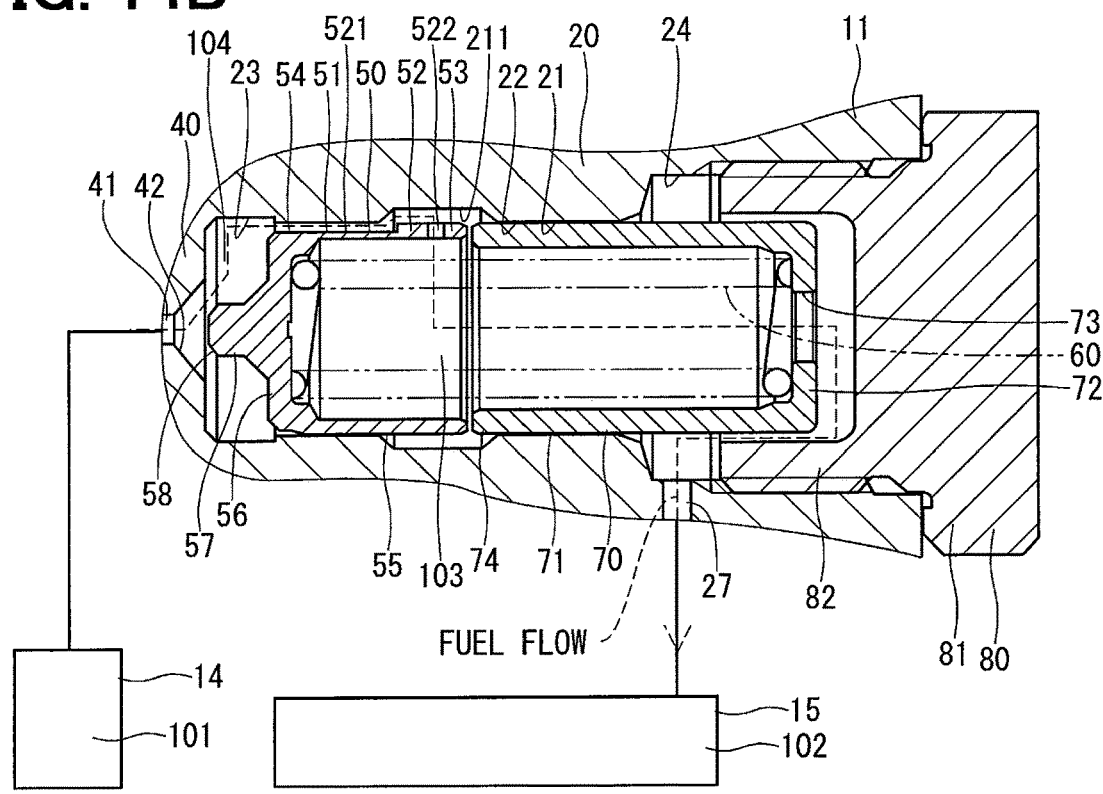
FIG. 14B is a cross-sectional view of the relief valve according to the first reference embodiment of the present disclosure, illustrating a state in which the seat is separated from the valve seat.

FIGS. 14A and 14B show a relief valve according to a first reference embodiment of the present disclosure.

In the first reference embodiment, a body 20 does not have the first hole 25 and the hole opening 26 described in the first embodiment (FIGS. 1A and 1B).

In the first reference embodiment, the body 20 has a third large diameter portion 211. The third large diameter portion 211 is formed in the middle of a reference inner diameter portion 22 in the axial direction. The third large diameter portion 211 is formed such that an inner diameter is larger than inner diameters of the reference inner diameter portion 22 and a first large diameter portion 23 and smaller than an inner diameter of a second large diameter portion 24.

The valve member 50 has a notch 521 and a hole 522. The notch 521 is formed by notching an outer wall of a large diameter portion 53 of a tubular portion 52 at a side of a small diameter portion 54 in a plane manner. The notch 521 is formed to be a plane parallel to an axis of the tubular portion 52. That is, in the tubular portion 52, a part of the outer wall of the large diameter portion 53 is notched in a plane manner. Thus, a sectional shape of the outer wall of the large diameter portion 53 including the notch 521 taken by a plane orthogonal to the axis of the tubular portion 52 is formed in a substantially D-shape.

The hole 522 is formed to connect the outer wall and an inner wall of the large diameter portion 53 of the tubular portion 52.

With the configuration described above, as shown in FIG. 14B, when the relief valve is opened and the fuel pressure in an intermediate chamber 104 is increased and the valve member 50 is moved in a direction away from a valve seat portion 40, inner spaces of the intermediate chamber 104 and the tubular portion 52 are communicated with each other via a space between the notch 521 and the tubular inner wall 21 (the third large diameter portion 211), and the hole 522. With this, the fuel in a first space 101 (a discharge passage 14) can flow toward a second space 102 (a fuel chamber 15) via a valve hole 41, the intermediate chamber 104, the space between the notch 521 and the tubular inner wall 21 (the third large diameter portion 211), the hole 522, a space inside a spring seat 70, a space between the spring seat 70 and a sealing portion 80, and a second hole 27. As a result, the fuel pressure in the discharge passage 14 can be decreased.

Second Reference Embodiment

Figure 15A:
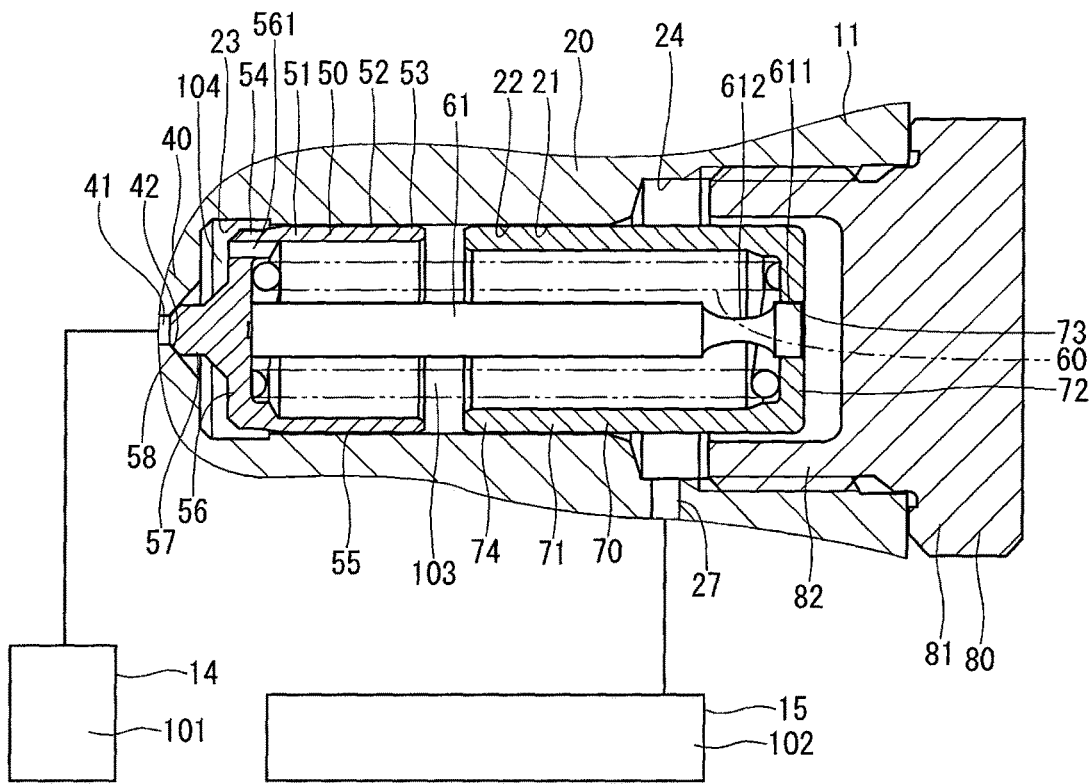
FIG. 15A is a cross-sectional view of a relief valve according to a second reference embodiment of the present disclosure, illustrating a state in which a seat is contacted with a valve seat.
Figure 15B:
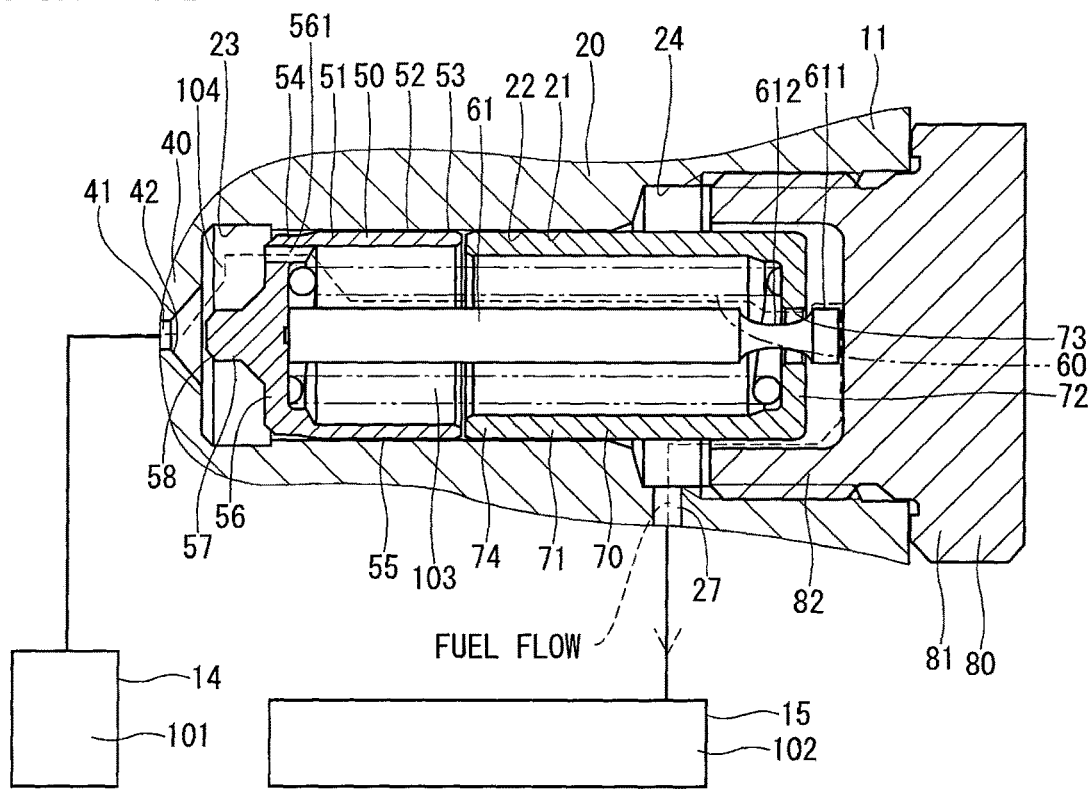
FIG. 15B is a cross-sectional view of the relief valve according to the second reference embodiment of the present disclosure, illustrating a state in which the seat is separated from the valve seat.

FIGS. 15A and 15B show a relief valve according to a second reference embodiment of the present disclosure.

In the second reference embodiment, a body 20 does not have the first hole 25 and the hole opening 26 described in the first embodiment (FIGS. 1A and 1B).

In the second reference embodiment, the relief valve has a bar 61. The bar 61 is formed in a bar shape, in particular an elongate tubular shape, formed of metal such as stainless steel. The bar 61 is arranged such that one end is fixed to a bottom 56 of a valve member 50 and another end is located inside a hole 73 of a bottom 72 of a spring seat 70.

The bar 61 is formed such that a length in an axial direction is set to be substantially equal to a distance between an end surface of the bottom 56 of the valve member 50 at a side of the spring seat 70 and an end surface of the bottom 72 of the spring seat 70 at a side of a sealing portion 80 in a state in which a seat 58 is contacted with a valve seat 42.

The bar 61 has a slide outer wall 611 and a small diameter portion 612. The slide outer wall 611 is formed on an outer wall at another side of the bar 61. The slide outer wall 611 is formed such that an outer diameter is equal to an inner diameter of the hole 73 of the bottom 72 of the spring steat or slightly smaller than the inner diameter of the hole 73. With this, when the bar 61 is moved in the axial direction together with the valve member 50, the slide outer wall 611 can be slid on an inner wall of the hole 73 of the bottom 72 of the spring seat 70.

The small diameter portion 612 is formed at a side of the valve member 50 of the slide outer wall 611 of the bar 61. The small diameter portion 612 is formed, for example, by cutting an outer wall of the bar 61 toward an inside in a radial direction.

The valve member 50 has a hole 561. The hole 561 is formed to connect a wall surface of the bottom 56 of the valve member 50 at a side of the valve seat portion 40 and a wall surface of the bottom 56 of the valve member 50 at a side of the spring seat 70.

With the configuration described above, as shown in FIG. 15B, when the relief valve is opened and the fuel pressure in an intermediate chamber 104 is increased and the valve member 50 is moved in the direction away from the valve seat portion 40, the fuel in a first space 101 (a discharge passage 14) can flow toward a second space 102 (a fuel chamber 15) via a valve hole 41, the intermediate chamber 104, the hole 561, a space inside a tubular portion 52, a space inside a tubular portion 71, a space between the hole 73 and the small diameter portion 612, a space between the spring seat 70 and the sealing portion 80, and a second hole 27. As a result, the fuel pressure in the discharge passage 14 can be decreased.

Third Reference Embodiment

Figure 16A:
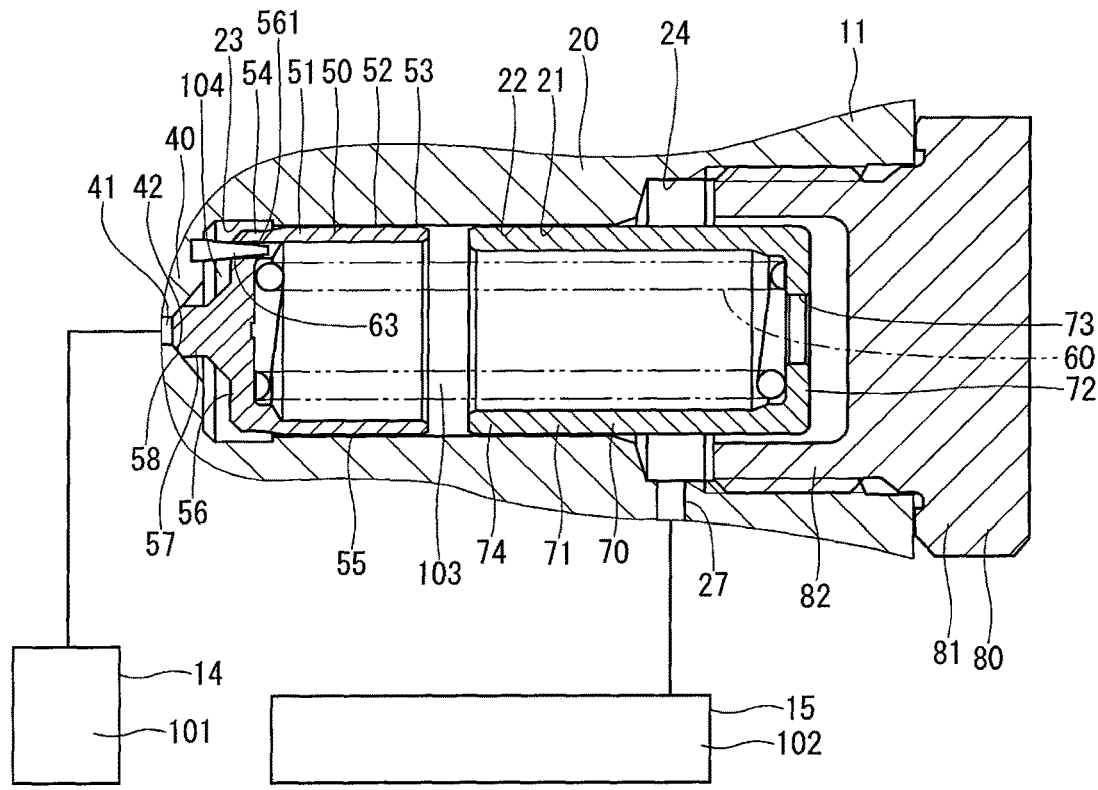
FIG. 16A is a cross-sectional view of a relief valve according to a third reference embodiment of the present disclosure, illustrating a state in which a seat is contacted with a valve seat.
Figure 16B:
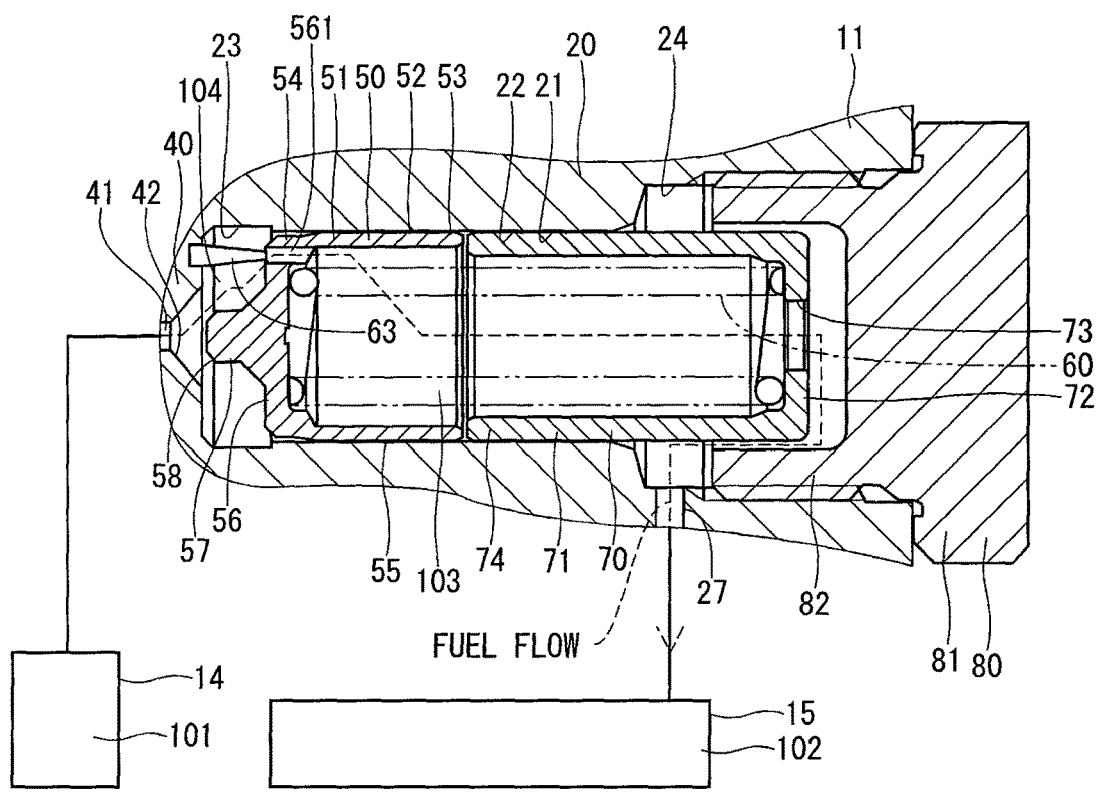
FIG. 16B is a cross-sectional view of the relief valve according to the third reference embodiment of the present disclosure, illustrating a state in which the seat is separated from the valve seat.

FIGS. 16A and 16B show a relief valve according to a third reference embodiment of the present disclosure.

In the third reference embodiment, a body 20 does not have the first hole 25 and the hole opening 26 described in the first embodiment (FIGS. 1A and 1B).

In the third reference embodiment, the relief valve has a pin 63. The pin 63 is formed in a bar shape, in particular an elongated conical shape, formed of metal such as stainless steel. One end having a large outer diameter of the pin 63 is fixed to a valve seat portion 40.

A valve member 50 has a hole 561. The hole 561 is formed to connect a wall surface of a bottom 56 of the valve member 50 at a side of the valve seat portion 40 and a wall surface of the bottom 56 of the valve member 50 at a side of a spring seat 70.

The pin 63 is arranged such that another end having a small outer diameter is located inside of the hole 561 of the valve member 50 in a state in which a seat 58 is contacted with a valve seat 42. At this time, the hole 561 is closed by the pin 63. That is, an outer wall of the pin 63 and an inner wall of the hole 561 are contacted with each other. On the other hand, when the valve member 50 is moved in a direction away from the valve seat portion 40, the outer wall of the pin 63 and the inner wall of the hole 561 are separated (see FIG. 16B).

With the configuration described above, as shown in FIG. 16B, when the relief valve is opened and the fuel pressure in an intermediate chamber 104 is increased and the valve member 50 is moved in the direction away from the valve seat portion 40, the fuel in a first space 101 (a discharge passage 14) can flow toward a second space 102 (a fuel chamber 15) via a valve hole 41, the intermediate chamber 104, the hole 561, a space inside a tubular portion 52, a space inside a tubular portion 71, a hole 73, a space between the spring seat 70 and a sealing portion 80, and a second hole 27. As a result, the fuel pressure in the discharge passage 14 can be decreased.

Fourth Reference Embodiment

Figure 17A:
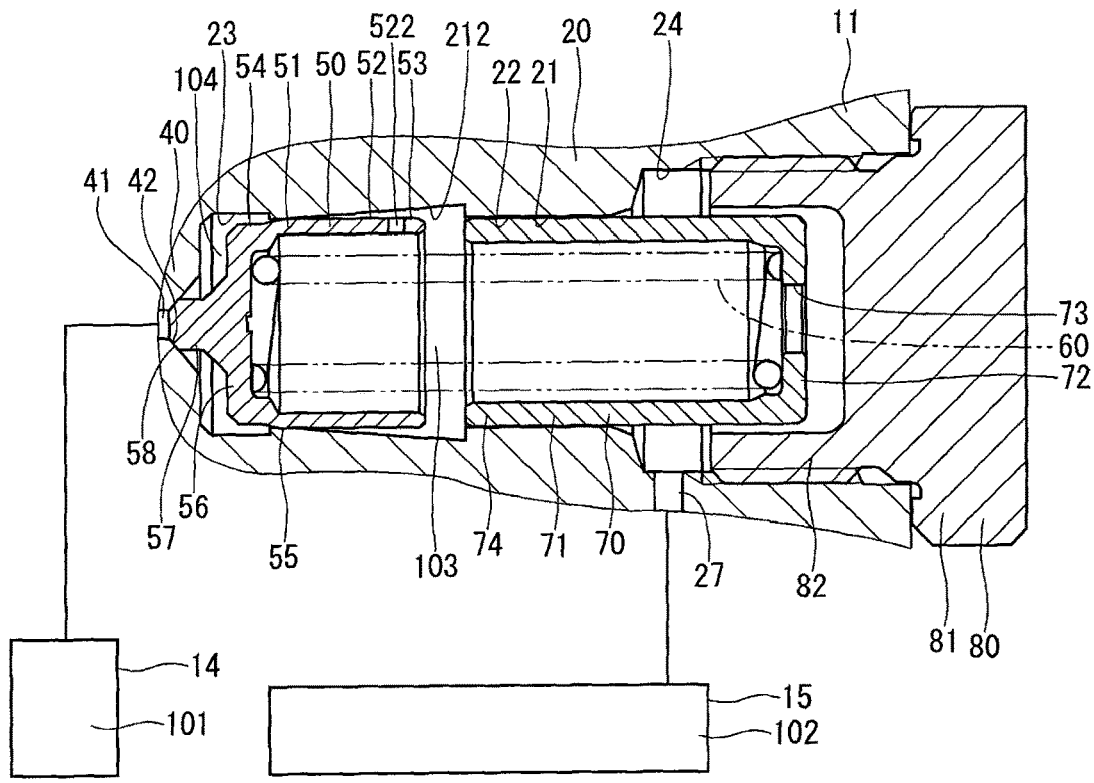
FIG. 17A is a cross-sectional view of a relief valve according to a fourth reference embodiment of the present disclosure, illustrating a state in which a seat is contacted with a valve seat.
Figure 17B:
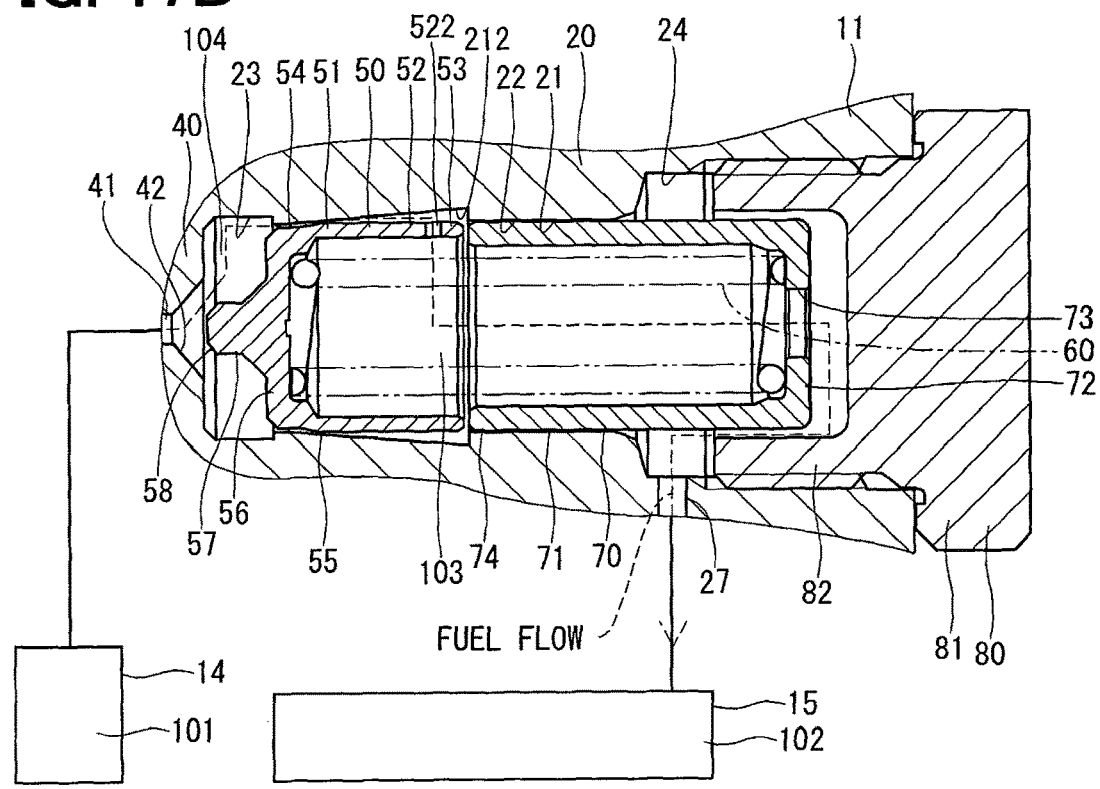
FIG. 17B is a cross-sectional view of the relief valve according to the fourth reference embodiment of the present disclosure, illustrating a state in which the seat is separated from the valve seat.

FIGS. 17A and 17B show a relief valve according to a fourth reference embodiment of the present disclosure.

In the fourth reference embodiment, a body 20 does not have the first hole 25 and the hole opening 26 described in the first embodiment (FIGS. 1A and 1B).

In the fourth embodiment, the body 20 has a tapered portion 212. The tapered portion 212 is formed in the middle of a reference inner diameter portion 22 in an axial direction. The tapered portion 212 is formed in a tapered shape in which an inner diameter is increased toward a spring seat 70 from a valve seat portion 40.

A slide outer wall 55 can be slid on the reference inner diameter portion 22 of the tapered portion 212 at a side of the valve seat portion 40.

A valve member 50 has a hole 522. The hole 522 is formed to connect an outer wall and an inner wall of a large diameter portion 53 of a tubular portion 52.

With the configuration described above, as shown in FIG. 17B, when the relief valve is opened and the fuel pressure in an intermediate chamber 104 is increased and the valve member 50 is moved in the direction away from the valve seat portion 40, an inner space of the intermediate chamber 104 and an inner space of the tubular portion 52 are communicated with each other via a space between the tubular portion 52 and a tubular inner wall 21 (the tapered portion 212), and the hole 522. With this, the fuel in a first space 101 (a discharge passage 14) can flow toward a second space 102 (a fuel chamber 15) via a valve hole 41, the intermediate chamber 104, the space between the tubular portion 52 and the tubular inner wall 21 (the tapered portion 212), the hole 522, a space inside the spring seat 70, a space between the spring seat 70 and a sealing portion 80 and a second hole 27. As a result, the fuel pressure in the discharge passage 14 can be decreased.

Fifth Reference Embodiment

Figure 18A:
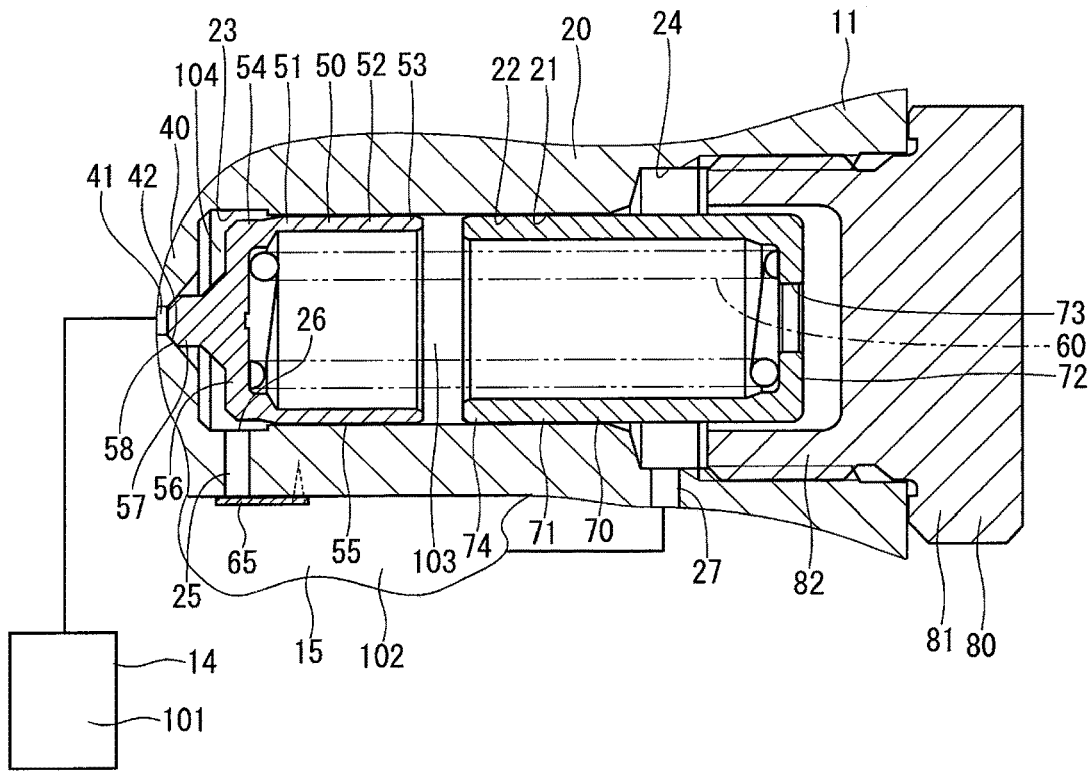
FIG. 18A is a cross-sectional view of a relief valve according to a fifth reference embodiment of the present disclosure, illustrating a state in which a seat is contacted with a valve seat.
Figure 18B:
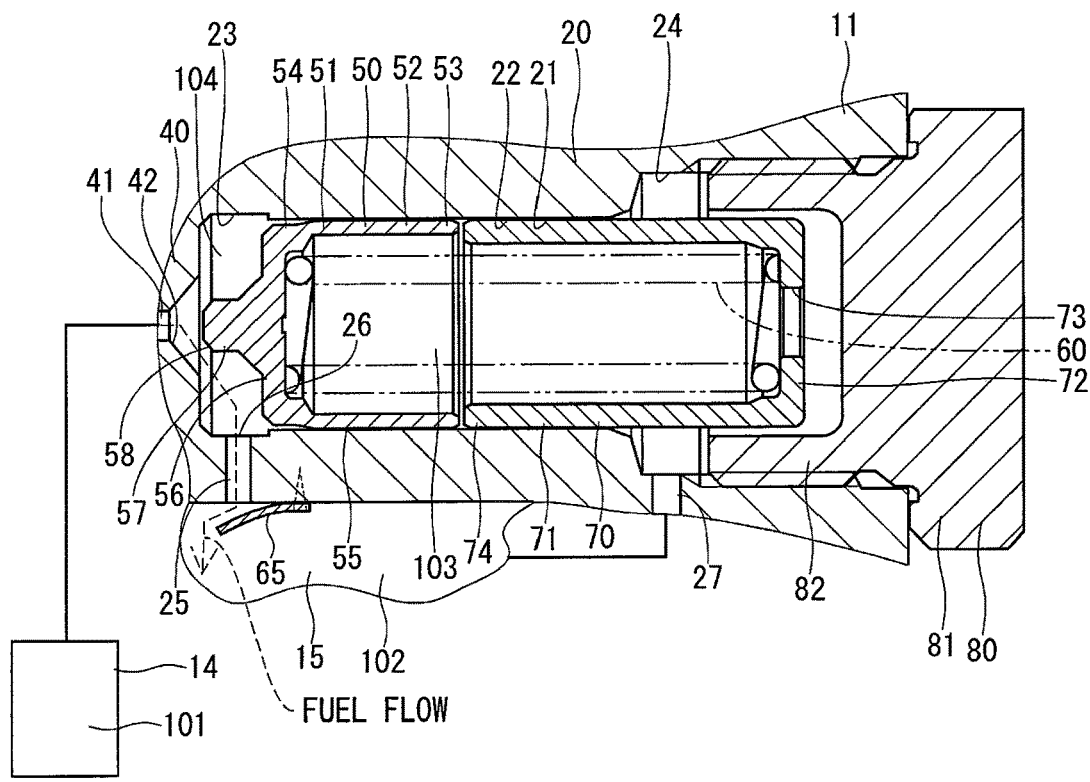
FIG. 18B is a cross-sectional view of the relief valve according to the fifth reference embodiment of the present disclosure, illustrating a state in which the seat is separated from the valve seat.

FIGS. 18A and 18B show a relief valve according to a fifth reference embodiment of the present disclosure.

In the fifth reference embodiment, a hole opening 26 of a first hole 25 is formed on a first large diameter portion 23. Thus, an intermediate chamber 104 and the first hole 25 are communicate with each other in a state in which a seat 58 is contacted with a valve seat 42.

In the fifth embodiment, the relief valve is provided with a reed valve 65. The reed valve 65 is formed by a thin plate of metal such as stainless steel. The reed valve 65 is arranged to close an opening of the first hole 25 at a side of a fuel chamber 15. An outer edge of the reed valve 65 is fixed to a part separated by a predetermined distance from the opening of the first hole 25 of an inner wall of a housing 11 that forms the fuel chamber 15, for example, by means of welding. In the reed valve 65, a part opposite to the part fixed to the inner wall of the housing 11 can be elastically deformed so as to be away from the opening of the first hole 25.

With the configuration described above, as shown in FIG. 18B, when the relief valve is opened, the fuel pressure in the intermediate chamber 104 is increased and a valve member 50 is moved in a direction away from a valve seat portion 40, and the fuel pressure in the first hole 25 is increased and the reed valve 65 is opened by being away from the opening of the first hole 25. With this, the fuel in a first space 101 (a discharge passage 14) can flow toward a second space 102 (a fuel chamber 15) via a valve hole 41, the intermediate chamber 104, and the first hole 25. As a result, the fuel pressure in the discharge passage 14 can be decreased.

Sixth Reference Embodiment

Figure 19A:
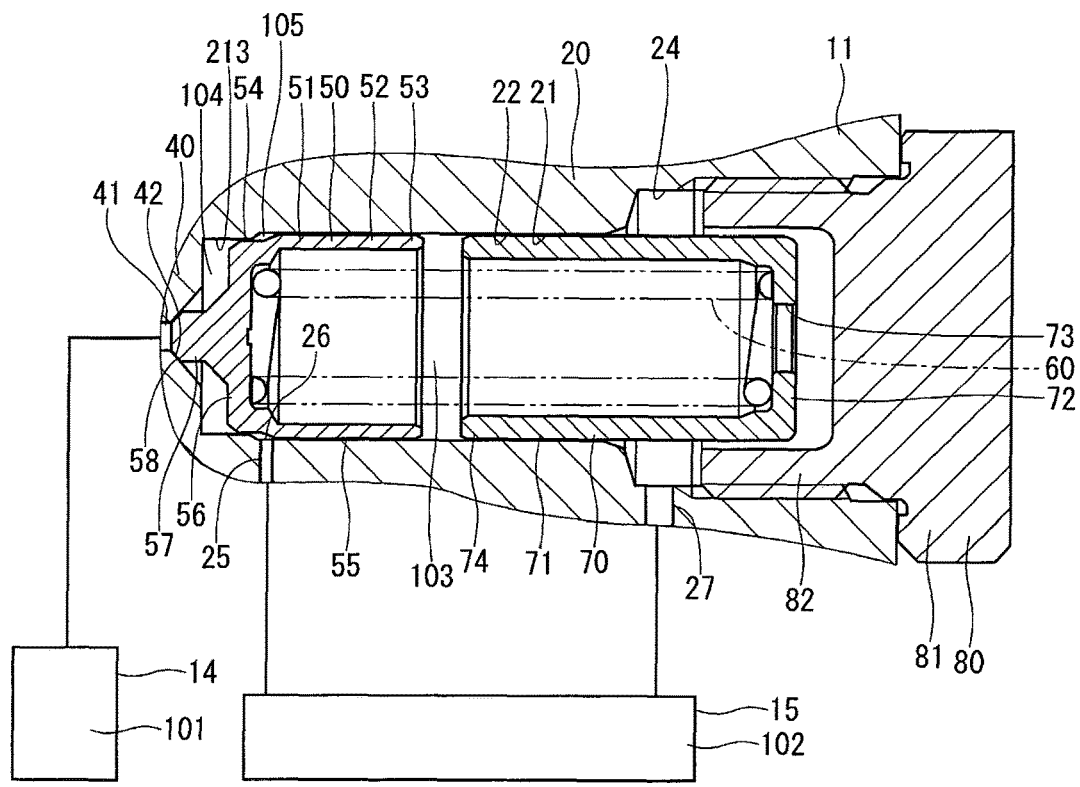
FIG. 19A is a cross-sectional view of a relief valve according to a sixth reference embodiment of the present disclosure, illustrating a state in which a seat is contacted with a valve seat.
Figure 19B:
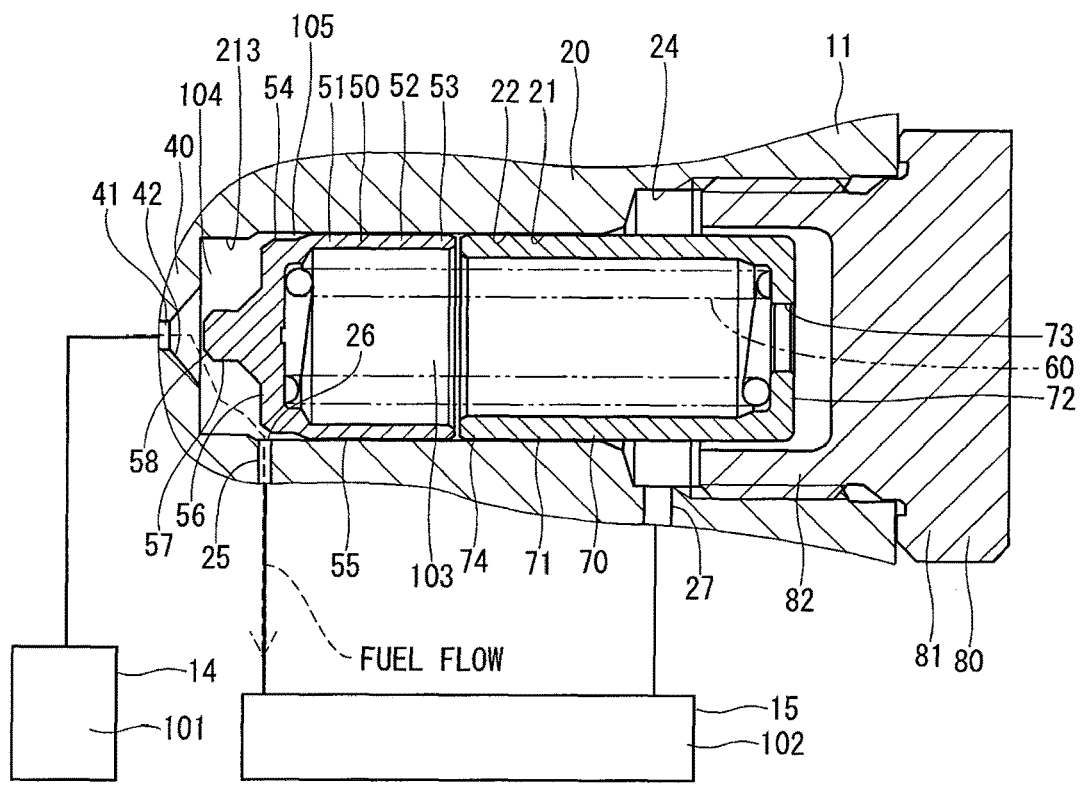
FIG. 19B is a cross-sectional view of the relief valve according to the sixth reference embodiment of the present disclosure, illustrating a state in which the seat is separated from the valve seat.

FIGS. 19A and 19B show a relief valve according to a sixth reference embodiment of the present disclosure.

In the sixth reference embodiment, a body 20 has a small diameter portion 213 instead of the first large diameter portion 23 shown in the first embodiment (FIGS. 1A and 1B). The small diameter portion 213 is formed in a tubular shape having an inner diameter smaller than an inner diameter of a reference inner diameter portion 22 in a tubular inner wall 21. The small diameter portion 213 is formed at a side of a valve seat portion 40 of the reference inner diameter portion 22. A hole opening 26 of a first hole 25 is formed at a side of the small diameter portion 213 of the reference inner diameter portion 22.

In the small diameter portion 213, the inner diameter is set to be substantially the same as an outer diameter of a small diameter portion 54 of a valve member 50 or slightly larger than the outer diameter of the small diameter portion 54. With this, an outer wall of the small diameter portion 54 can be slid on an inner wall of the small diameter portion 213. An outer wall of a large diameter portion 53 of the valve member 50 can be slid on the reference inner diameter portion 22.

In a state in which a seat 58 is contacted with a valve seat 42, an annular space 105 is formed between the small diameter portion 54 of the valve member 50 and the reference inner diameter portion 22 of the body 20. At this time, the annular space 105 and an intermediate chamber 104 are not communicated with each other, while the annular space 105 and a first hole 25 are communicated with each other.

When the valve member 50 is moved in a direction away from the valve seat portion 40, the intermediate chamber 104 and the annular space 105 are communicated with each other (see FIG. 19B).

With the configuration described above, as shown in FIG. 19B, when the relief valve is opened, the fuel pressure in the intermediate chamber 104 is increased and the valve member 50 is moved in a direction away from the valve seat portion 40, and then the intermediate chamber 104 and the annular space 105 are communicated with each other. With this, the fuel in a first space 101 (a discharge passage 14) can flow toward a second space 102 (a fuel chamber 15) via a valve hole 41, the intermediate chamber 104, the annular space 105, and the first hole 25. As a result, the fuel pressure in the discharge passage 14 can be decreased.

In the sixth reference embodiment, an outer edge of the hole opening 26 is not slid on both of the outer wall (the slide outer wall 55) of the large diameter portion 53 and the outer wall of the small diameter portion 54. Thus, wear of the outer edge of the hole opening 26 can be suppressed. Operation failure (valve opening failure) of the valve member 50 because of the outer wall of the large diameter portion 53 (the slide outer wall 55) or the outer wall of the small diameter portion 54 being hooked with the outer edge or an inner edge of the hole opening 26 can be suppressed.

OTHER EMBODIMENTS

In another embodiment of the present disclosure, the body and the valve seat portion may be formed separately as respective members.

In the embodiments described above, a configuration in which the coil spring formed as the biasing member is arranged between the valve member and the spring seat to bias the valve member toward the valve seat, is described as an example. However, in another embodiment of the present disclosure, for example, the biasing member formed by a plate spring or the like may be arranged between the valve member and the body to bias the valve member toward the valve seat.

In the embodiments described above, a configuration in which, when the moving restriction portion restricts the moving of the valve member toward the spring seat, namely the valve member and the moving restriction portion (the spring seat) are contacted with each other, the overlap area between the hole opening and the slide outer wall is equal to "0" and the minimum passage area between the intermediate chamber and the hole is equal to the area of the hole opening, is described as an example. However, in another embodiment of the present disclosure, when the moving restriction portion restricts the moving of the valve member toward the spring seat, the overlap area between the hole opening and the slide outer wall may be set to be more than "0" and less than the area of the hole opening, and the minimum passage area between the intermediate chamber and the hole may be set to be more than "0" and less than the area of the hole opening. This configuration can be obtained by changing the position of the moving restriction portion (the spring seat) in the embodiments described above toward the valve seat portion appropriately and fixing the position of the moving restriction portion. In this way, by setting the position of the valve member that can be restricted by the moving restriction portion, the maximum valve of the minimum passage area between the intermediate chamber and the hole can be set to be less than the area of the hole opening.

In the embodiments described above, a configuration in which the moving restriction portion and the spring seat are formed integrally is described as an example. However, in another embodiment of the present disclosure, the moving restriction portion may be formed separately from the spring seat as a different member. The moving restriction portion may be formed integrally with the body. In another embodiment of the present disclosure, the relief valve may not be provided with the moving restriction portion.

In another embodiment of the present disclosure, a shape of the hole opening is not limited to a perfect circle, a rectangle, or a triangle, and the shape of the hole opening may be in any shape such as an oval shape, and a polygonal shape having five or more corners. In any case in which the shape of the hole opening is set in any shape, the overlap area between the hole opening and the slide outer wall becomes gradually smaller and the minimum passage area between the intermediate chamber and the hole becomes gradually larger as the edge of the slide outer wall at the side of the valve seat portion is moved toward the spring seat on the hole opening.

In the embodiments described above, a configuration in which the relief valve is arranged in the high pressure pump such that the end of the valve hole opposite to the intermediate chamber is connected to the discharge passage and the end of the hole (the first hole 25) opposite to the intermediate chamber 104 is connected to the fuel chamber 15, is described as an example. However, in another embodiment of the present disclosure, the relief valve may be arranged in the high pressure pump such that the valve hole is connected to the discharge passage and the hole (the first hole 25) is connected to the pressurizing chamber 12 (a space between the suction valve 16 and the discharge valve 17).

In the embodiments described above, a configuration in which the body of the relief valve is formed integrally with the housing of the high pressure pump, is described as an example. However, in another embodiment of the present disclosure, the body of the relief valve may be formed separately from the housing of the high pressure pump as a different member. The relief valve may be arranged independently at a position away from the housing.

The relief valve may be formed such that the valve hole is connected to a space, which is communicated with the discharge passage, such as a space in the pipe 5, a space in the fuel rail 6, and the like. The relief valve may be formed such that the hole (the first hole 25) is connected to a space in the suction passage or the space, which is communicated with the discharge passage, such as a space in the pipe 4, and a space in the fuel tank 2. The relief valve may be formed such that the hole (the first hole 25) is connected to a space at an atmospheric side, namely connected to the atmosphere. In this case, the space at the atmospheric side corresponds to "the second space".

The relief valve of the present disclosure is not limited to be applied to the high pressure pump of the vehicle and therefore the relief valve of the present disclosure may be applied to other devices as long as the valve hole is connected to a space in which fluid pressure is high.

In this way, the present disclosure is not limited to the embodiments described above, and therefore the present disclosure can be carried out by various configurations within the scope of the subject matter of the present disclosure.

The invention claimed is:

1. A high pressure pump comprising:
a relief valve connected to a first space and a second space different from the first space and being capable of decreasing fluid pressure in the first space, the relief valve including:
a body having a tubular inner wall that is formed as an inner wall formed in a tubular shape, a first hole formed to connect an inside space that is formed as a space inside the tubular inner wall and the second space, a second hole formed to connect the inside space and the second space at an axial position different from the first hole, and a hole opening that is formed as an opening of the first hole formed on the tubular inner wall;
a valve seat portion that is formed to close one end of the tubular inner wall, the valve seat portion having a valve hole formed to connect the inside space and the first space, and a valve seat formed in a ring shape and arranged at an outer side in a radial direction of an end of the valve hole at a side of the inside space;
a valve member including a valve body arranged in the inside space in a reciprocal manner in an axial direction, a slide outer wall that is an outer wall to be slid on the tubular inner wall among the outer wall of the valve body, and a seat that is formed at a side of the valve seat with respect to the valve body and is contactable with the valve seat, the valve member forming an intermediate chamber that is changed in volume in accordance with a position of the valve body in the axial direction against the tubular inner wall and that is communicated with the valve hole and the first hole, between the tubular inner wall and the valve seat portion, the valve member communicating the valve hole with the intermediate chamber when the seat is separated from the valve seat, and the valve member interrupting the valve hole and the intermediate chamber when the seat is contacted with the valve seat; and a biasing member that biases the valve member toward the valve seat portion, the high pressure pump further comprising a housing including a pressurizing chamber that sucks a fuel and pressurizes the fuel, a suction passage in which the fuel sucked into the pressurizing chamber flows, a fuel chamber communicated with the pressurizing chamber through the suction passage and a discharge passage in which the fuel pressurized in the pressurizing chamber and discharged from the pressurizing chamber flows, wherein the valve member includes at least a specific range in which an overlap area that is an area in which the hole opening and the slide outer wall are overlapped with each other becomes gradually smaller and a minimum passage area that is a passage area between the intermediate chamber and the first hole being minimum becomes gradually larger as the valve member is moved in a direction away from the valve seat portion in a movable range in the axial direction, the first space is formed as a space in the discharge passage or a space communicated with the discharge passage;

the second space is formed as a space in the suction passage or a space in the fuel chamber;

the second hole is formed to connect the space of the inside space, which is at a side opposite to the intermediate chamber, and the second space; and the valve member is arranged to interrupt communication between the intermediate chamber and the inside space, which is at a side opposite to the intermediate chamber in the body, and interrupt communication between the first hole and the second hole through the inside space.

2. The high pressure pump according to claim 1, wherein the intermediate chamber and the first hole are not communicated with each other when the seat is contacted with the valve seat.

3. The high pressure pump according to claim 1, further comprising
a moving restriction portion that is configured to restrict the valve member moving in a direction away from the valve seat portion.

4. The high pressure pump according to claim 1, wherein the valve member includes a concave portion formed to be recessed in a radial inner direction from the slide outer wall at a position corresponding to the hole opening in a state in which the seat is contacted with the valve seat.

5. The high pressure pump according to claim 1, wherein the hole opening is formed in a circle, a rectangle, or a triangle.

6. A high pressure pump comprising:
a relief valve connected to a first space and a second space different from the first space and being capable of decreasing fluid pressure in the first space, the relief valve including:
a body having a tubular inner wall that is formed as an inner wall formed in a tubular shape, a first hole formed to connect an inside space that is formed as a space inside the tubular inner wall and the second space, a second hole formed to connect the inside space and the second space at an axial position different from the first hole, and a hole opening that is formed as an opening of the first hole formed on the tubular inner wall;
a valve seat portion that is formed to close one end of the tubular inner wall, the valve seat portion having a valve hole formed to connect the inside space and the first space, and a valve seat formed in a ring shape and arranged at an outer side in a radial direction of an end of the valve hole at a side of the inside space;

a valve member including a valve body arranged in the inside space in a reciprocal manner in an axial direction, a slide outer wall that is an outer wall to be slid on the tubular inner wall among the outer wall of the valve body, and a seat that is formed at a side of the valve seat with respect to the valve body and is contactable with the valve seat, the valve member forming an intermediate chamber that is changed in volume in accordance with a position of the valve body in the axial direction against the tubular inner wall and that is communicated with the valve hole and the first hole, between the tubular inner wall and the valve seat portion, the valve member communicating the valve hole with the intermediate chamber when the seat is separated from the valve seat, and the valve member interrupting the valve hole and the intermediate chamber when the seat is contacted with the valve seat; and a biasing member that biases the valve member toward the valve seat portion, the high pressure pump further comprising a housing including a pressurizing chamber that sucks a fuel and pressurizes the fuel, a suction passage in which the fuel sucked into the pressurizing chamber flows, a fuel chamber communicated with the pressurizing chamber through the suction passage and a discharge passage in which the fuel pressurized in the pressurizing chamber and discharged from the pressurizing chamber flows, wherein the valve member includes at least a specific range in which an overlap area that is an area in which the hole opening and the slide outer wall are overlapped with each other becomes gradually smaller and a minimum passage area that is a passage area between the intermediate chamber and the first hole being minimum becomes gradually larger as the valve member is moved in a direction away from the valve seat portion in a movable range in the axial direction, the first space is formed as a space in the discharge passage or a space communicated with the discharge passage;

the second space is a space in fluidic communication with the pressurizing chamber, and the pressurizing chamber is between the fuel chamber and the discharge passage; and the valve member is arranged to interrupt communication between the intermediate chamber and the inside space, which is at a side opposite to the intermediate chamber in the body, and interrupt communication between the first hole and the second hole through the inside space.

7. The high pressure pump according to claim 6, wherein the intermediate chamber and the first hole are not communicated with each other when the seat is contacted with the valve seat.

8. The high pressure pump according to claim 6, further comprising
a moving restriction portion that is configured to restrict the valve member moving in a direction away from the valve seat portion.

9. The high pressure pump according to claim 6, wherein the valve member includes a concave portion formed to be recessed in a radial inner direction from the slide outer wall at a position corresponding to the hole opening in a state in which the seat is contacted with the valve seat.

10. The high pressure pump according to claim 6, wherein the hole opening is formed in a circle, a rectangle, or a triangle.

* * * * *